US012578534B2

(12) United States Patent
   Cryan

(10) Patent No.: US 12,578,534 B2
(45) Date of Patent: Mar. 17, 2026

(54) POWER INSENSITIVE STABLE ISOLATOR WAVELENGTH DIVISION MULTIPLEXER

(71) Applicant: Cisco Technology, Inc., San Jose, CA (US)

(72) Inventor: Colm Cryan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 250 days.

(21) Appl. No.: 18/462,925

(22) Filed: Sep. 7, 2023

(65) Prior Publication Data

US 2024/0353623 A1    Oct. 24, 2024

Related U.S. Application Data

(60) Provisional application No. 63/497,144, filed on Apr. 19, 2023.

(51) Int. Cl.
   *G02B 6/293*     (2006.01)
   *H04J 14/02*     (2006.01)
(52) U.S. Cl.
   CPC ............ *G02B 6/2938* (2013.01); *H04J 14/02* (2013.01)
(58) Field of Classification Search
   CPC ............................... G02B 6/2938; H04J 14/02
   USPC .......................................................... 385/24
   See application file for complete search history.

(56) References Cited

U.S. PATENT DOCUMENTS

| | | | |
|---|---|---|---|
| 2003/0068119 A1* | 4/2003 | Xie ................... | G02B 6/29386 |
| | | | 385/47 |
| 2019/0250336 A1* | 8/2019 | Guo .................... | H04B 10/675 |
| 2022/0069535 A1 | 3/2022 | Cryan | |

OTHER PUBLICATIONS

Extended European Search Report for corresponding European Patent Application No. 24170098.8, dated Nov. 27, 2024.

* cited by examiner

*Primary Examiner* — Jerry M Blevins

(74) *Attorney, Agent, or Firm* — Patterson + Sheridan, LLP

(57)             ABSTRACT

Disclosed is an apparatus, including an isolator wavelength division multiplexer (IWDM). A signal-fiber is optically coupled to a first side of the WDM-Isolator core. The signal-fiber is configured to propagate signal light. A pump-fiber defines an expanded tip optically coupled to the WDM-Isolator core. The pump-fiber is configured to propagate pump light. A common-fiber is optically coupled to the WDM-Isolator core. The common-fiber is configured to propagate a combination of the signal light and the pump light. The WDM-Isolator core is configured to transmit the signal light to the common-fiber and to reflect the pump light into the common-fiber.

20 Claims, 23 Drawing Sheets

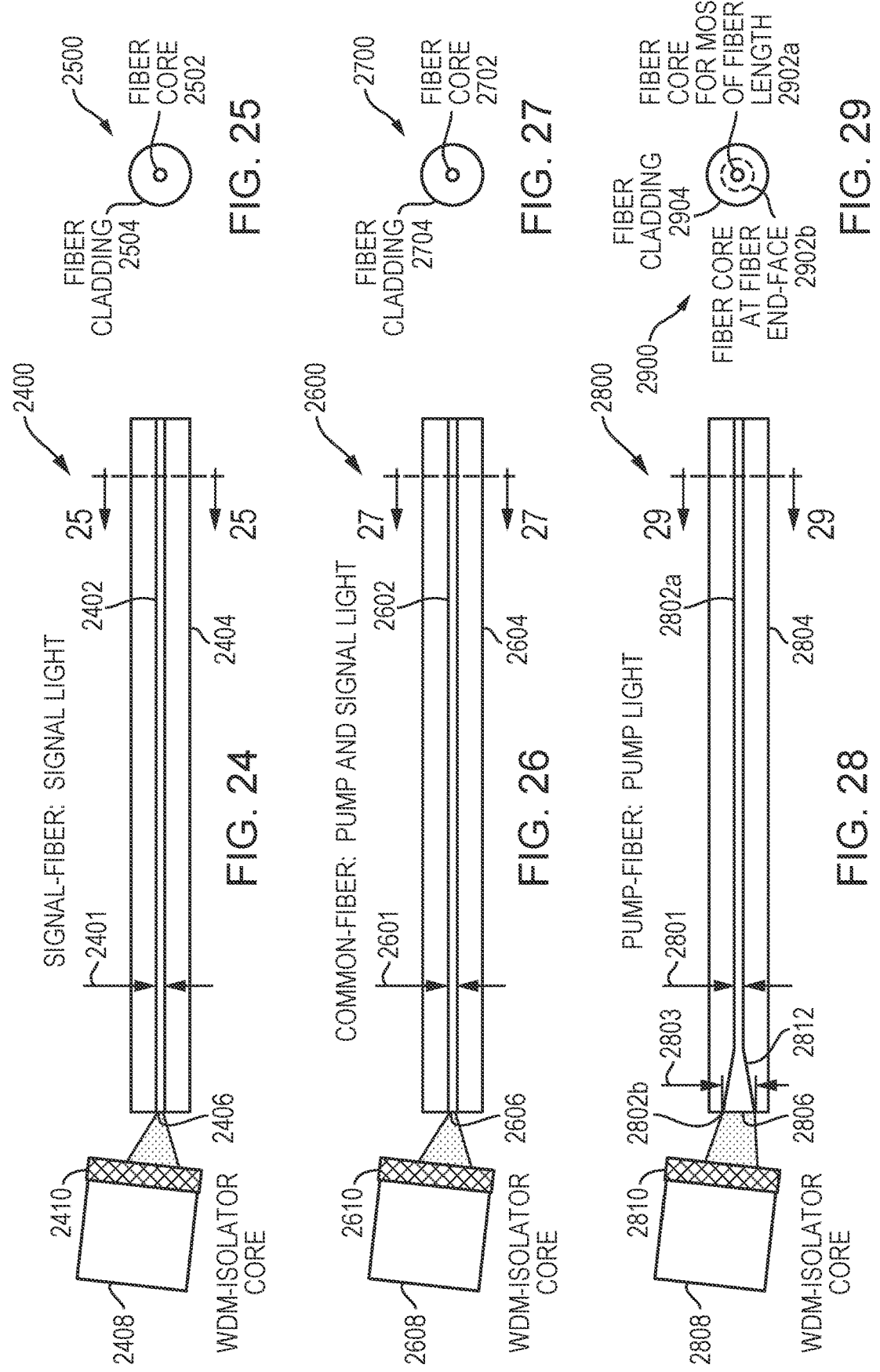

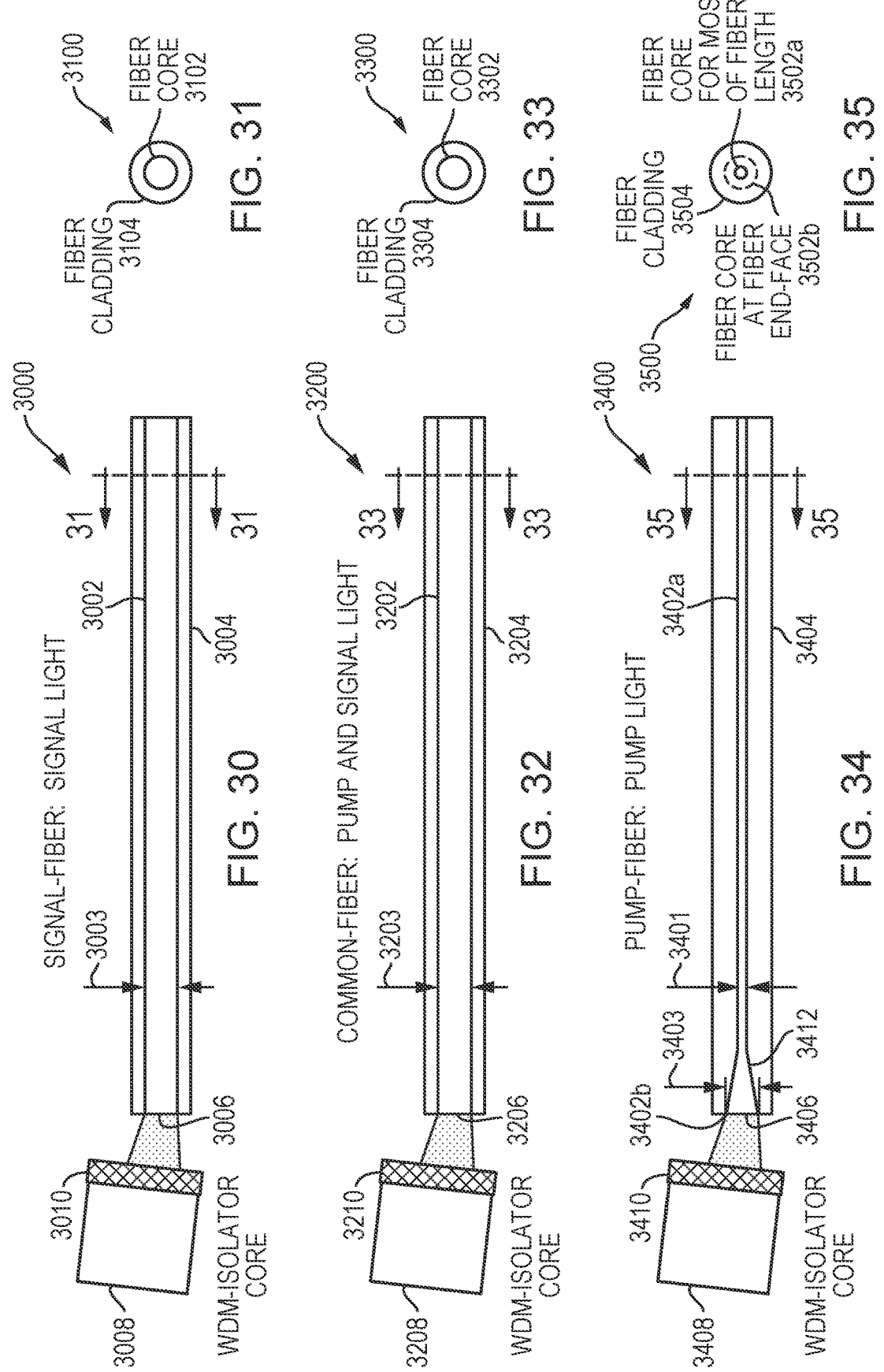

SIGNAL-FIBER: SIGNAL LIGHT

COMMON-FIBER: PUMP AND SIGNAL LIGHT

PUMP-FIBER: PUMP LIGHT

FIBER CLADDING 3704

FIBER CORE 3702

FIBER CLADDING 3904

FIBER CORE 3902

FIBER CLADDING 4104

FIBER CORE FOR MOST OF FIBER LENGTH 4102a

FIBER CORE AT FIBER END-FACE 4102b

WDM-ISOLATOR CORE

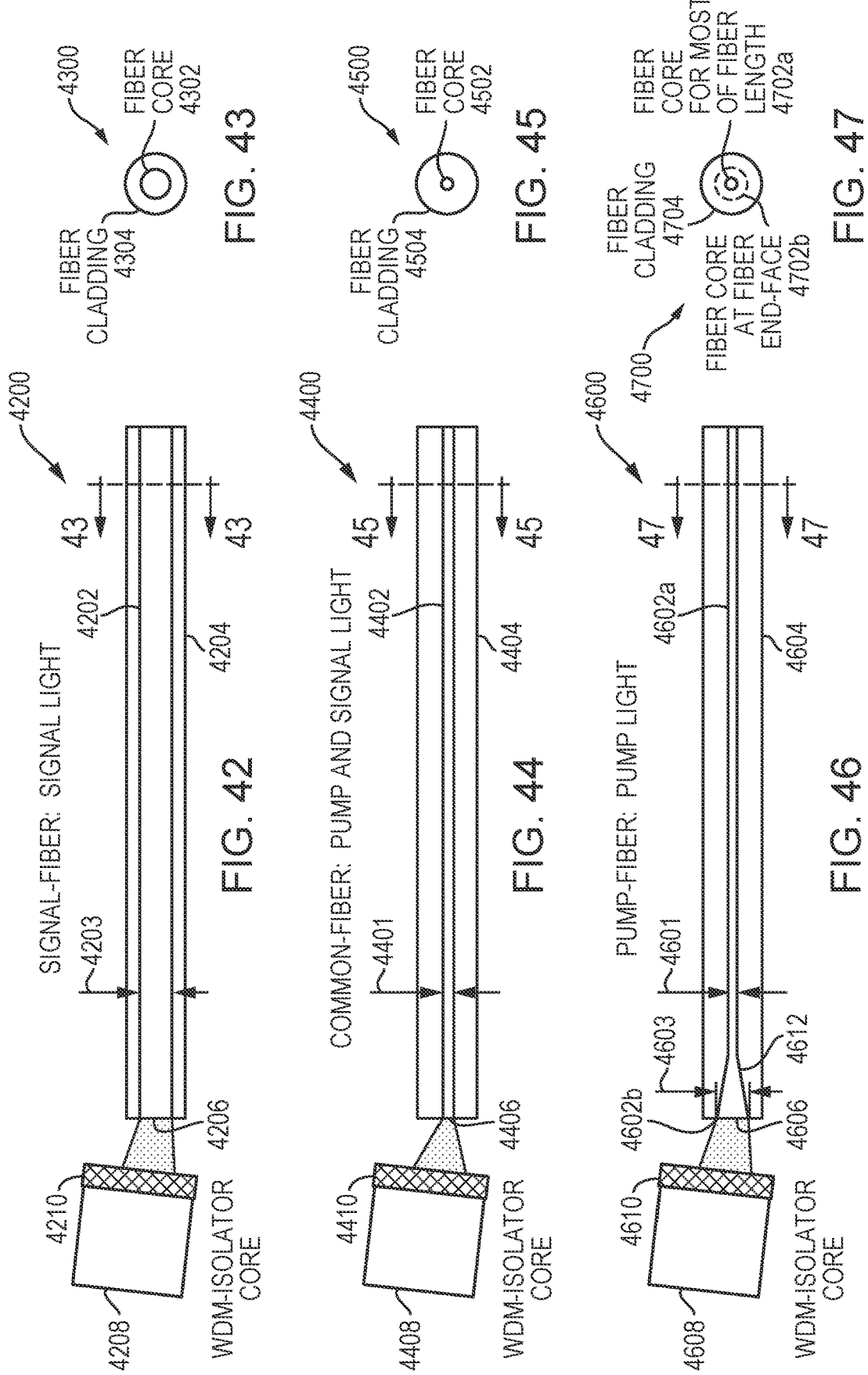

FRUSTOCONICAL SHAPE EXPANDED TIP 5000a

FIRST DIAMETER 5001a

SECOND DIAMETER 5003a

CONCAVE SHAPE EXPANDED TIP 5000b

FIRST DIAMETER 5001b

SECOND DIAMETER 5003b

CONVEX SHAPE EXPANDED TIP 5000c

FIRST DIAMETER 5001c

SECOND DIAMETER 5003c

5000

1

POWER INSENSITIVE STABLE ISOLATOR WAVELENGTH DIVISION MULTIPLEXER

CROSS-REFERENCE TO RELATED APPLICATION

This application is a non-provisional application claiming the benefit under 35 U.S.C. § 119(e) of provisional U.S. Patent Application Ser. No. 63/497,144, entitled POWER INSENSITIVE STABLE ISOLATOR WAVELENGTH DIVISION MULTIPLEXER, filed Apr. 19, 2023, the disclosure of which is incorporated by reference herein in its entirety.

TECHNICAL FIELD

The present disclosure relates generally to the field of photonic systems and more particularly relates to a wavelength division multiplexer (WDM) isolator, also referred to herein as an isolator wavelength division multiplexer (IWDM), and optical fibers for use within an amplifying circuit.

BACKGROUND

Contemporary optical communications and other photonic systems make extensive use of photonic integrated circuits (PICs) that are advantageously mass-produced in various configurations for various purposes. One of the components typically used in optical communications and other photonic systems is an isolator WDM, or an IWDM, which is used when building optical amplifier circuits. In a general sense, an optical amplifier circuit will take a pump light and convert it into a signal light, wherein the signal light is the data that is desired to be transmitted. However, the signal light that is desired to be transmitted will continue to become weaker over time and continued amplification will be necessary. In order to amplify this signal, the erbium ions in an erbium doped fiber (EDF) are excited using pump light wherein excitation occurs at a wavelength around 980 nm or 1480 nm. Once the erbium ions in the EDF are excited, a signal can be passed through the EDF and one of two things will happen. In a first case, if there is no light in the signal, then the light outputted from the EDF will comprise some remnants of pump light and optical noise, referred to as amplified spontaneous emission (ASE). However, in a second case, if there is some light in the signal, then the EDF fiber will amplify the signal by pulling energy from the excited erbium ions and the signal will get brighter. In this second case, the output from the EDF will comprise remnants of pump light, ASE and the amplified signal light. Thus, it is desired that a scenario be created where both the signal light and the pump light are traveling in the same fiber. Then, as combined in a single fiber, they will flow along the fiber allowing the signal to pull energy from the erbium ions that have been excited by the pump light. In this desired scenario, the EDF converts pump light to signal light, and the signal will be amplified as a result. This scenario is possible by the use of an IWDM which is formed of a WDM and an isolator. The WDM will take the two signals at different wavelengths and combine them together, while the isolator will stop light from going in the opposite direction of the signal light that entered the IWDM.

Despite having been used for quite a while, a number of problems stemming from the use of a WDM-Isolator and different optical fibers have been recently discovered. The first problem is that a core portion of the pump-fiber, which is surrounded by a cladding portion, can be damaged as a result of this amplification process. This is because it is desirable to have a lot of pump power to increase the level of optical amplification and to use a small diameter core in the pump lead into the IWDM to maintain the pump light in a single mode (SM). This first problem can be offset by using a larger core in the pump-fiber as this reduces the light intensity in the pump-fiber. The use of a larger core in the pump-fiber has recently been found to introduce a second problem. As the core of the pump-fiber increases, the pump-fiber shifts from single mode to multimode at the pump wavelength. Multimode fibers allow different modes to propagate in the fiber, each mode will have its own propagation constant such that the power distribution in the core of the fiber fluctuates as the light propagates along the optical fiber and as the optical fiber experiences mechanical stress, and/or bends and/or twists. When a MM pump-fiber is used in an amplifier it has been found to make the amplified output signal light unstable, wherein the output signal power from the amplifier fluctuates over time, even when the input signal light power is constant over time. Hence, it is desirable to have a small core in the pump-fiber to reduce the power density and a large core to maintain signal power stability. Pump power is a greater issue as device modules have become significantly smaller in size over time which forces the optical fibers in the optical amplifier to have higher erbium concentrations in the EDF and rely on a single pump to provide all the pump light as there is no space to add multiple pumps. As a result of these recent discoveries, different approaches have been taken to address core damage and increasing power instability, however, these approaches have only been able to solve one of the above-mentioned problems. The present disclosure takes a new approach which reduces damage to the core portion while also ensuring stable power.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 24 is a longitudinal sectional view of a signal-fiber comprising a core portion and a cladding portion, wherein the core portion defines a single diameter over a portion of its length including a fiber end-face optically coupled to a WDM-Isolator core, according to at least one embodiment of the disclosure.

FIG. 25 is a cross-sectional view of the signal-fiber shown in FIG. 24, taken along section line 25-25 of FIG. 24, according to at least one embodiment of the disclosure.

FIG. 26 is a longitudinal sectional view of a common-fiber comprising a core portion and a cladding portion, wherein the core portion defines a single diameter over a portion of its length including a fiber end-face optically coupled to a WDM-Isolator core, according to at least one embodiment of the disclosure.

FIG. 27 is a cross-sectional view of the common-fiber shown in FIG. 26, taken along section line 27-27 of FIG. 26, according to at least one embodiment of the disclosure.

FIG. 28 is a longitudinal section view of a pump-fiber comprising a core portion and a cladding portion, wherein the core portion defines a first diameter over a portion of its length and a second diameter at a fiber end-face optically coupled to a WDM-Isolator core, wherein the second diameter is greater than the first diameter to define an expanded tip, and wherein the diameters of the core portions of the signal-fiber and the common-fiber shown in FIGS. 24-27 are substantially the same as the first diameter of the core portion of the pump-fiber, according to at least one embodiment of the disclosure.

FIG. 29 is a cross-sectional view of the pump-fiber shown in FIG. 28, taken along section line 29-29 of FIG. 28, according to at least one embodiment of the disclosure.

FIG. 30 is a longitudinal sectional view of a signal-fiber comprising a core portion and a cladding portion, wherein the core portion defines a single diameter over a portion of its length including a fiber end-face optically coupled to WDM-Isolator core, according to at least one embodiment of the disclosure.

FIG. 31 is a cross-sectional view of the signal-fiber shown in FIG. 30, taken along section line 31-31 of FIG. 30, according to at least one embodiment of the disclosure.

FIG. 32 is a longitudinal sectional view of a common-fiber comprising a core portion and a cladding portion, wherein the core portion defines a single diameter over a portion of its length including a fiber end-face optically coupled to a WDM-Isolator core, wherein the diameter of the core portion of the signal-fiber shown in FIG. 30 is substantially the same as the diameter of the core portion of the common-fiber, according to at least one embodiment of the disclosure.

FIG. 33 is a cross-sectional view of the common-fiber shown in FIG. 32, taken along section line 33-33 of FIG. 32, according to at least one embodiment of the disclosure.

FIG. 34 is a longitudinal sectional view of a pump-fiber comprising a core portion and a cladding portion, wherein the core portion defines a first diameter over a portion of its length and a second diameter at a fiber end-face optically coupled to a WDM-Isolator core, wherein the second diameter is greater than the first diameter to define an expanded tip, and wherein the diameters of the core portions of the signal-fiber and common-fiber shown in FIGS. 30-33 are greater than the first diameter of the core portion of the pump-fiber, according to at least one embodiment of the disclosure.

FIG. 35 is a cross-sectional view of the pump-fiber shown in FIG. 34, taken along section line 35-35 of FIG. 34, according to at least one embodiment of the disclosure.

FIG. 42 is a longitudinal sectional view of a signal-fiber comprising a core portion and a cladding portion, wherein the core portion defines a single diameter over a portion of its length including a fiber end-face optically coupled to a WDM-Isolator core, according to at least one embodiment of the disclosure.

FIG. 43 is a cross-sectional view of the signal-fiber shown in FIG. 42, taken along section line 43-43 of FIG. 42, according to at least one embodiment of the disclosure.

FIG. 44 is a longitudinal sectional view of a common-fiber comprising a core portion and a cladding portion, wherein the core portion defines a single diameter over a portion of its length including a fiber end-face optically coupled to a WDM-Isolator core, wherein the diameter of the core portion of the signal-fiber shown in FIG. 42 is greater than the diameter of the core portion of the common-fiber, according to at least one embodiment of the disclosure.

FIG. 45 is a cross-sectional view of the common-fiber shown in FIG. 44, taken along section line 45-45 of FIG. 44, according to at least one embodiment of the disclosure.

FIG. 46 is a longitudinal sectional view of a pump-fiber comprising a core portion and a cladding portion, wherein the core portion defines a first diameter over a portion of its length and a second diameter at a fiber end-face optically coupled to a WDM-Isolator core, wherein the second diameter is greater than the first diameter to define an expanded tip, and wherein the diameter of the core portion of the signal-fiber shown in FIG. 42 is greater than the first diameter of the core portion of the pump-fiber, according to at least one embodiment of the disclosure.

FIG. 47 is a cross-sectional view of the pump-fiber shown in FIG. 46, taken along section line 47-47 of FIG. 46, according to at least one embodiment of the disclosure.

As applied to the aforementioned figures, the terms "fiber core" and "fiber cladding" are meant to be substantially equivalent to the terms "core portion" and "cladding portion," respectively, as used below in the present disclosure.

DESCRIPTION OF EXAMPLE EMBODIMENTS

Overview

In part, in one aspect, the present disclosure relates to an apparatus, comprising: an isolator wavelength division multiplexer (IWDM) comprising a WDM-Isolator core; a first fiber optically coupled to the WDM-Isolator core, the first fiber configured to propagate light at a first wavelength; a second fiber defining an expanded tip optically coupled to the WDM-Isolator core, the second fiber configured to propagate light at a second wavelength; and a third fiber optically coupled to the WDM-Isolator core, the third fiber configured to propagate a combination of the light at the first wavelength and the light at the second wavelength; wherein the WDM-Isolator core is configured to transmit the light at the first wavelength to the third fiber and to reflect the light at the second wavelength into the third fiber.

EXAMPLE EMBODIMENTS

Figure 1:
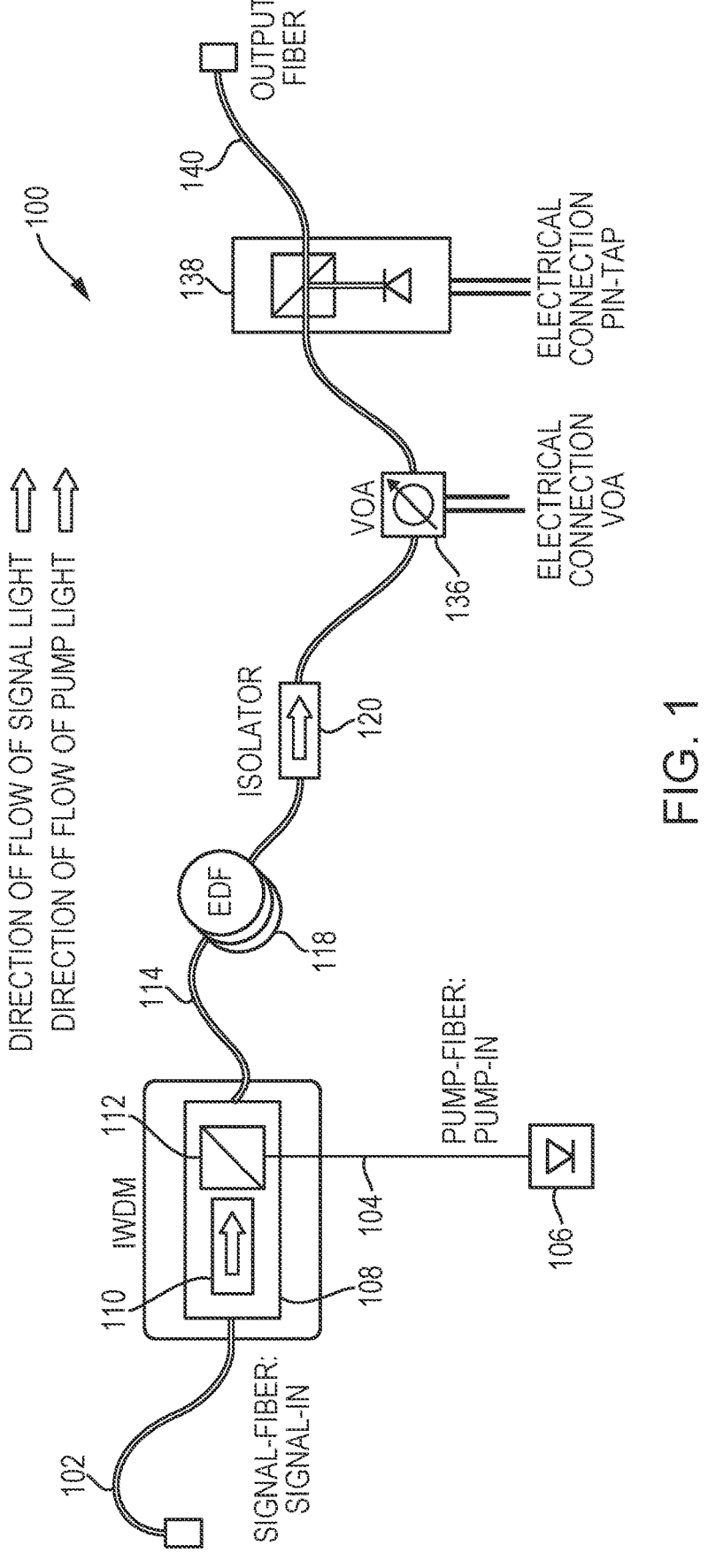
FIG. 1 is a schematic diagram of a photonic system, according to at least one embodiment of the disclosure.

With reference now to the figures, FIG. 1 is a schematic diagram of a photonic system 100 providing a general context of a use of various components described herein, according to at least one embodiment of the disclosure. The photonic system 100 comprises an input signal-fiber 102 suitable for transmitting light at a first wavelength λ1 (e.g., 1550 nm) and a pump-fiber 104 suitable for transmitting light at a second wavelength λ2 (e.g., 980 nm), which enters from pump 106. Light at the first wavelength λ1 (signal light) enters the IWDM 108, which comprises an isolator 110 and a WDM 112, via the signal-fiber 102. The signal light propagates through the signal-fiber 102 through the IWDM 108 with substantially no reflections. Light at the second wavelength λ2 (pump light) propagates through the pump-fiber 104 and reflects off of the WDM 112 of the IWDM 108 and combines with the signal light in a common-fiber 114. The combined pump and signal light then co-propagates through the common-fiber 114 to an erbium-doped fiber (EDF) 118. Following the EDF 118, the pump light is substantially attenuated and the signal light travels through an isolator 120 before traveling through a component 136 combining a tunable optical filter (TOF) and a variable optical attenuator (VOA). Finally, the signal light passes through an electrical connection P-type Intrinsic-N-type (PIN) tap system 138 that extracts a portion of the signal from the optical fiber (i.e., the common-fiber 114) without breaking the connection before outputting the signal at the output fiber 140. Generally, the importance of FIG. 1 is to understand the co-propagation properties of signal light and pump light through a photonic system. It should be noted that those having ordinary skill in the art would have a fundamental understanding of the various components described above and the context to which they generally relate to the present disclosure.

Figure 2:
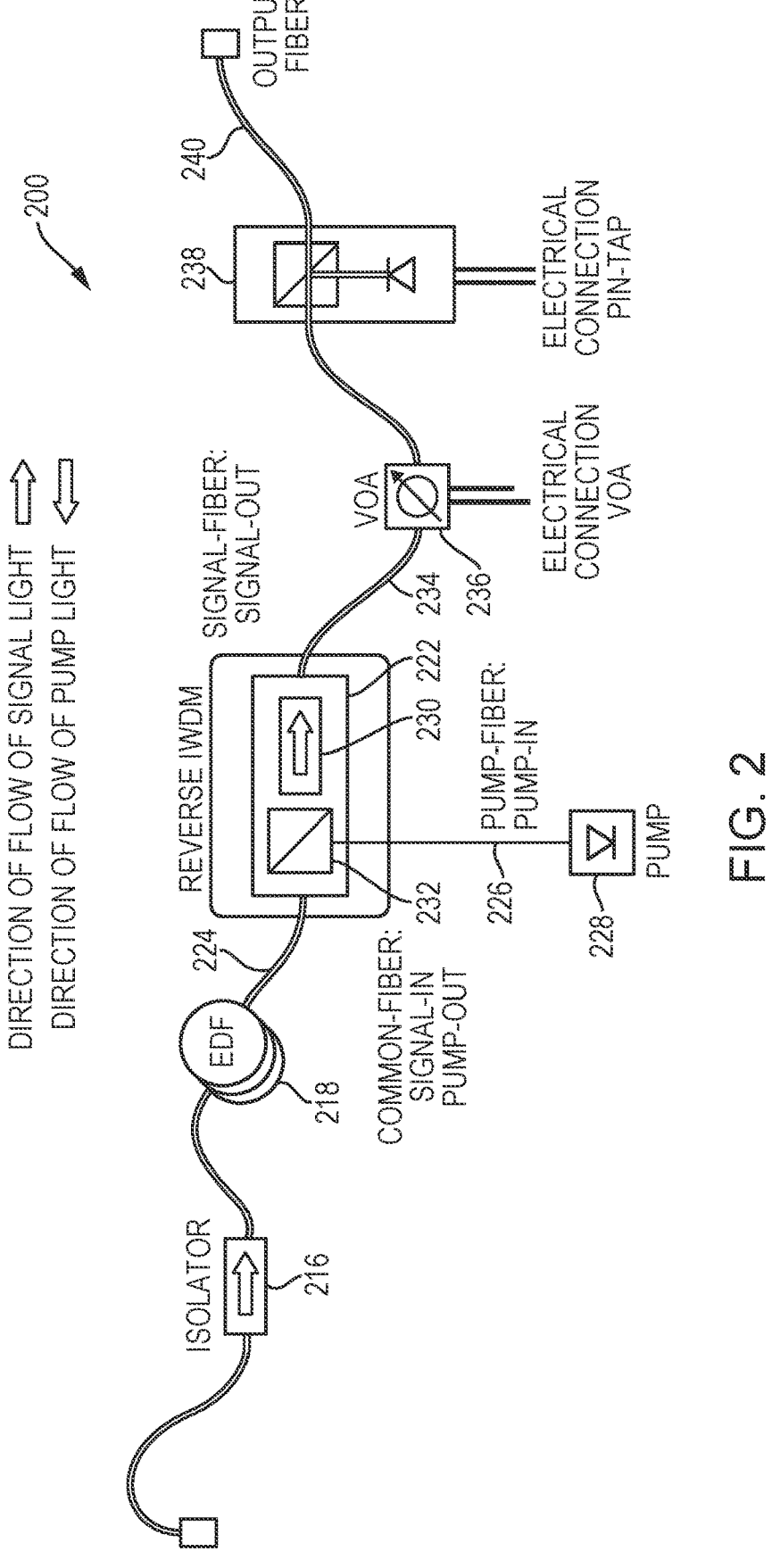
FIG. 2 is a schematic diagram of a photonic system, according to at least one embodiment of the disclosure.

FIG. 2 is a schematic diagram of a photonic system 200 providing a general context of a use of various components described herein, according to at least one embodiment of the disclosure. The photonic system 200 comprises a reverse IWDM 222, which comprises an isolator 230 and a WDM 232. Furthermore, the reverse IWDM 222 is connected to a common-fiber 224 suitable for transmitting light at a first wavelength $\lambda 1$ (e.g., 1550 nm) and a second wavelength $\lambda 2$ (e.g., 980 nm), a pump-fiber 226 suitable for transmitting light at the second wavelength $\lambda 2$, which enters from pump 228, and a signal-fiber 234 suitable for transmitting light at the first wavelength $\lambda 1$. In relation to the reverse IWDM 222, the common-fiber 224 acts as an input for light at the first wavelength $\lambda 1$ (signal light) and an output for light at the second wavelength $\lambda 2$ (pump light), the pump-fiber 226 acts as an input for light at the second wavelength $\lambda 2$ (pump light), and the signal-fiber 234 acts as an output for light at the first wavelength $\lambda 1$ (signal light). In this system, signal light begins by propagating through the common-fiber 224 through isolator 216, through erbium-doped fiber (EDF) 218, and through the reverse IWDM 222 with substantially no reflections. Following the reverse IWDM 222, signal light propagates through the signal-fiber 234 through a component 236 combining a tunable optical filter (TOF) and a variable optical attenuator (VOA). Finally, the signal light passes through an electrical connection P-type Intrinsic-N-type (PIN) tap system 238 that extracts a portion of the signal light from the optical fiber (i.e., the signal-fiber 234) without breaking the connection before outputting the signal as the output fiber 240. In this system, pump light begins by being pumped from pump 228 through pump-fiber 226. The pump light then reflects off of the WDM 232 of the reverse IWDM 222 and exits via the common-fiber 224. The pump light then propagates through EDF 218 and isolator 216 in a counter-direction compared to the signal light that is also traveling through common-fiber 224. Generally, the importance of FIG. 2 is to understand the counter-propagation properties of signal light and pump light through a photonic system. It should be noted that those having ordinary skill in the art would have a fundamental understanding of the various components described above and the context to which they generally relate to the present disclosure.

Figure 3:
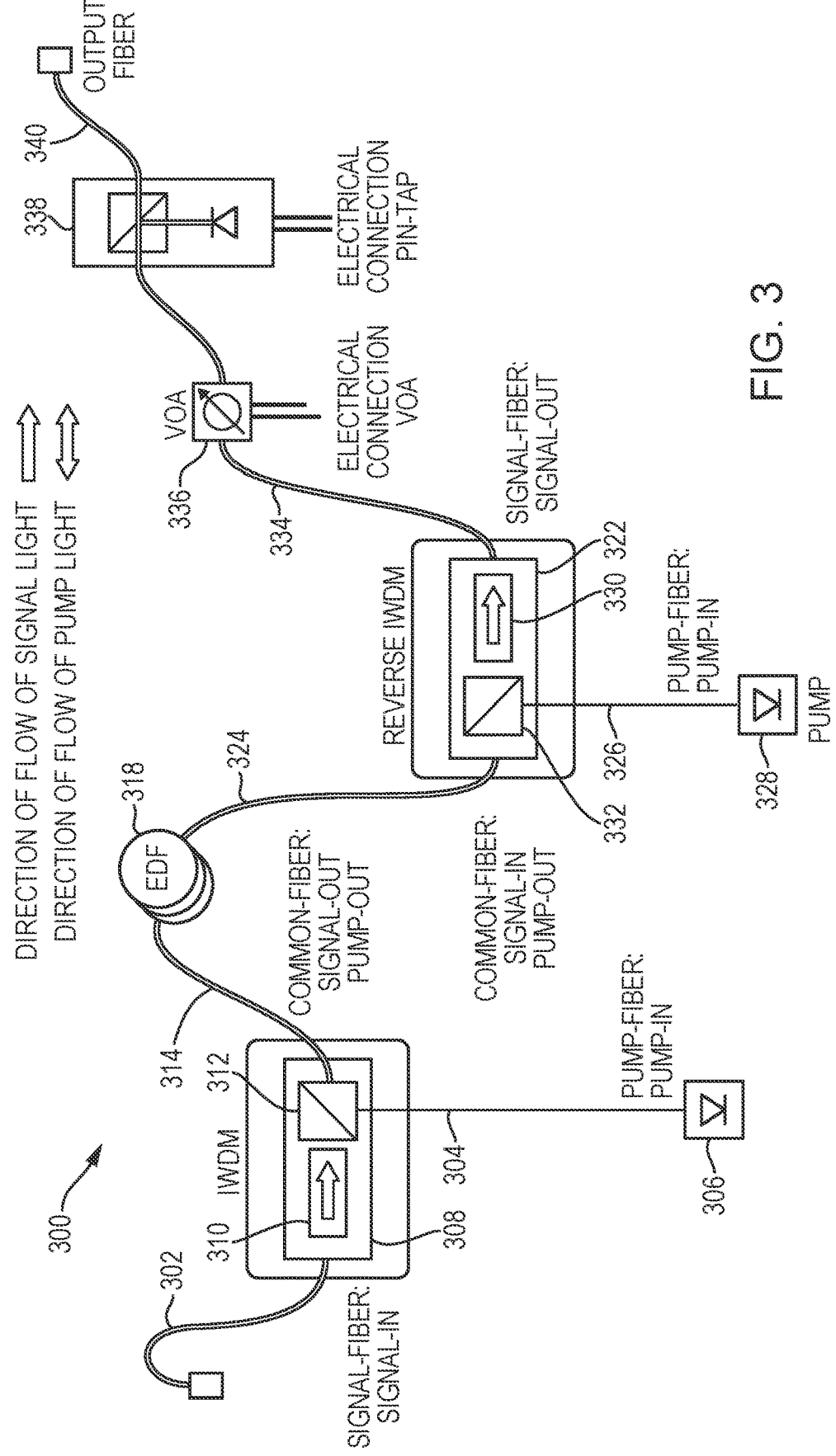
FIG. 3 is a schematic diagram of a photonic system, according to at least one embodiment of the disclosure.

FIG. 3 is a schematic diagram of a photonic system 300 providing a general context of a use of various components described herein, according to at least one embodiment of the disclosure. In a general sense, photonic system 300 combines the teachings of co-propagation from photonic system 100 and the teachings of counter-propagation from photonic system 200 into one system. Co-Propagation: The photonic system 300 comprises an input signal-fiber 302 suitable for transmitting light at a first wavelength $\lambda 1$ (e.g., 1550 nm) and a pump-fiber 304 suitable for transmitting light at a second wavelength $\lambda 2$ (e.g., 980 nm), which enters from pump 306. Light at the first wavelength $\lambda 1$ (signal light) enters the IWDM 308, which comprises an isolator 310 and a WDM 312, via the signal-fiber 302. The signal light propagates through the signal-fiber 302 through the IWDM 308 with substantially no reflections. Light at the second wavelength $\lambda 2$ (pump light) propagates through the pump-fiber 304 and reflects off of the WDM 312 of the IWDM 308 and combines with the signal light in a common-fiber 314. The combined pump and signal light then co-propagates through the common-fiber 314 to an erbium-doped fiber (EDF) 318. Now, beginning at the EDF 318, counter-propagation is present. Counter-Propagation: The photonic system 300 further comprises a reverse IWDM 322, which comprises an isolator 330 and a WDM 332. Furthermore, the reverse IWDM 322 is connected to a common-fiber 324 suitable for transmitting light at a first wavelength $\lambda 1$ (e.g., 1550 nm) and a second wavelength $\lambda 2$ (e.g., 980 nm), a pump-fiber 326 suitable for transmitting light at the second wavelength $\lambda 2$, which enters from pump 328, and a signal-fiber 334 suitable for transmitting light at the first wavelength $\lambda 1$. In relation to the reverse IWDM 322, the common-fiber 324 acts as an input for light at the first wavelength $\lambda 1$ (signal light) and an output for light at the second wavelength $\lambda 2$ (pump light), the pump-fiber 326 acts as an input for light at the second wavelength $\lambda 2$ (pump light), and the signal-fiber 334 acts as an output for light at the first wavelength $\lambda 1$ (signal light). In this system, signal light begins by propagating through the EDF 318 disclosed above, through the common-fiber 324, and through the reverse IWDM 322 with substantially no reflections. Following the reverse IWDM 322, signal light propagates through the signal-fiber 334 through a component 336 combining a tunable optical filter (TOF) and a variable optical attenuator (VOA). Finally, the signal light passes through an electrical connection P-type Intrinsic-N-type (PIN) tap system 338 that extracts a portion of the signal light from the optical fiber (i.e., the signal-fiber 334) without breaking the connection before outputting the signal as the output fiber 340. In this system, pump light begins by being pumped from pump 328 through pump-fiber 326. The pump light then reflects off of the WDM 332 of the reverse IWDM 322 and exits via the common-fiber 324. The pump light then propagates through EDF 318 in a counter-direction compared to the signal light that is also traveling through common-fiber 324. Generally, the importance of FIG. 3 is to understand the co-propagation and counter-propagation properties of signal light and pump light through a photonic system. In this case, the pump light travels in the forward and reverse direction, co-propagating and counter-propagating through the EDF 318 with respect to the signal light. It should be noted that those having ordinary skill in the art would have a fundamental understanding of the various components described above and the context to which they generally relate to the present disclosure.

Figures 4, 5:
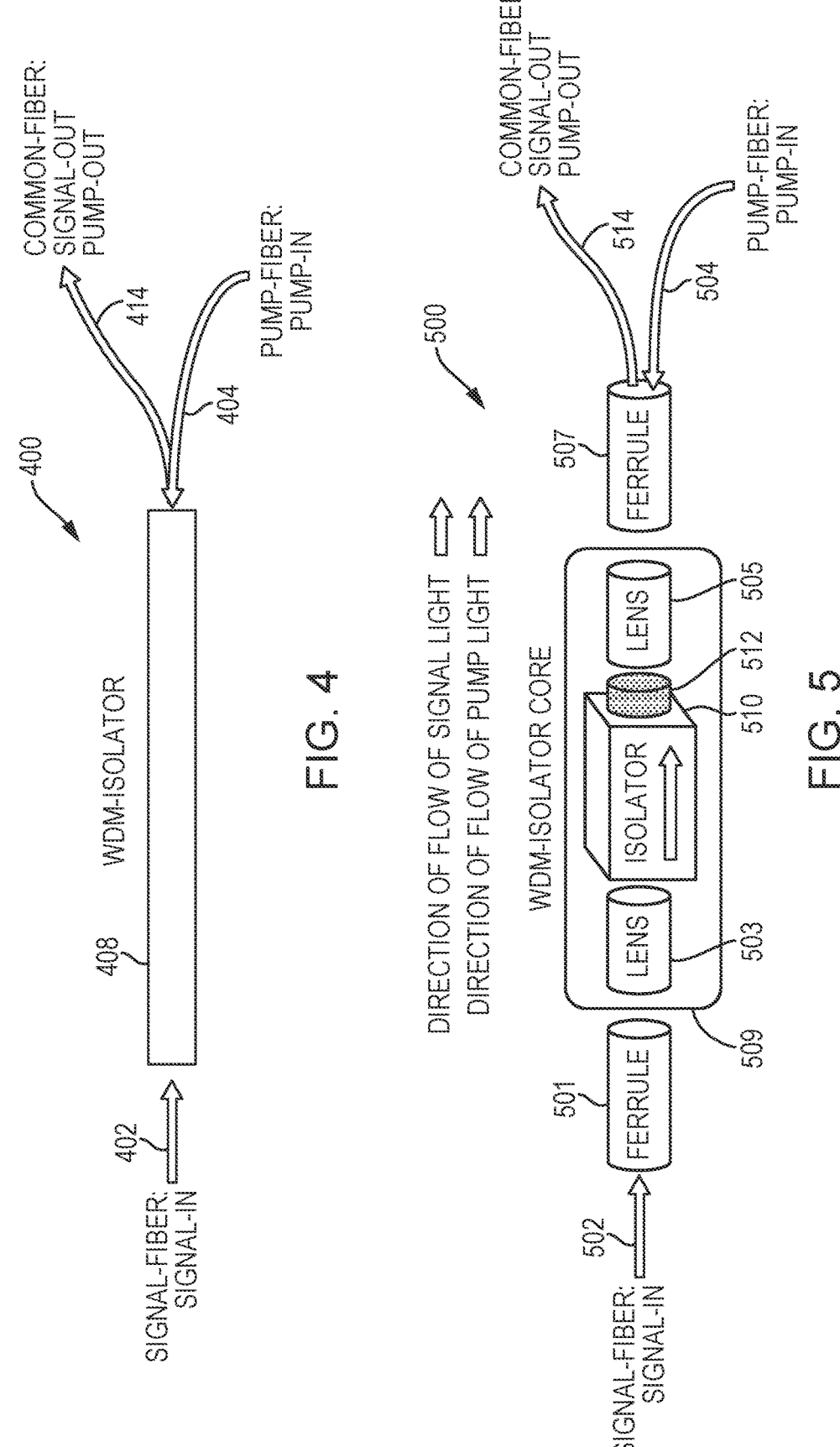
FIG. 4 illustrates a WDM-Isolator optically coupled to a signal-fiber, a pump-fiber, and a common-fiber, according to at least one embodiment of the disclosure.
FIG. 5 is a schematic diagram of WDM-Isolator components, according to at least one embodiment of the disclosure.

FIG. 4 illustrates a co-propagation system 400 including a WDM-Isolator 408, similar to that of IWDM 108 of FIG. 1, optically coupled to a signal-fiber 402, a pump-fiber 404, and a common-fiber 414, according to at least one embodiment of the disclosure. In at least one embodiment of the disclosure, the signal-fiber 402 is a single mode (SM) optical fiber that allows the propagation of light at a first wavelength $\lambda 1$ of 1550 nm, the pump-fiber 404 is a SM optical fiber that allows the propagation of light at a second wavelength $\lambda 2$ of 980 nm, and the common-fiber 414 is a single mode (SM) optical fiber that enables the propagation of the combined pump and signal light at the first and second wavelengths, $\lambda 1$ of 1550 nm and $\lambda 2$ of 980 nm respectively. As a co-propagation system, signal-fiber 402 acts as an input for signal light, pump-fiber 404 acts as an input for pump light, and common-fiber 414 acts as an output for both signal light and pump light. Similarly, FIG. 5 illustrates a co-propagation system 500, which is identical to the co-propagation system 400 of FIG. 4, with an exploded schematic view of several components of the system, according to at least one embodiment of the disclosure. The components include a first ferrule 501, a first lens 503, an isolator 510, a WDM filter 512, a second lens 505, and a second ferrule 507. Altogether, the first lens 503, isolator 510, filter 512, and second lens 505 form a WDM-Isolator core 509. The first ferrule 501 and the second ferrule 507 provide a means for attaching fibers to the WDM-Isolator core 509. The combination of the first ferrule 501, the WDM-Isolator core 509, and the second ferrule 507 form the WDM-Isolator, which is identical to that of the WDM-Isolator 408 in FIG. 4. Similar to the system 400 of FIG. 4, system 500 of FIG. 5 includes signal-fiber 502, pump-fiber 504, and common-fiber 514. As a co-propagation system as mentioned above, signal-fiber 502 acts as an input for signal light, pump-fiber 504 acts as an input for pump light, and common-fiber 514 acts as an output for both signal light and pump light.

Figures 6, 7:
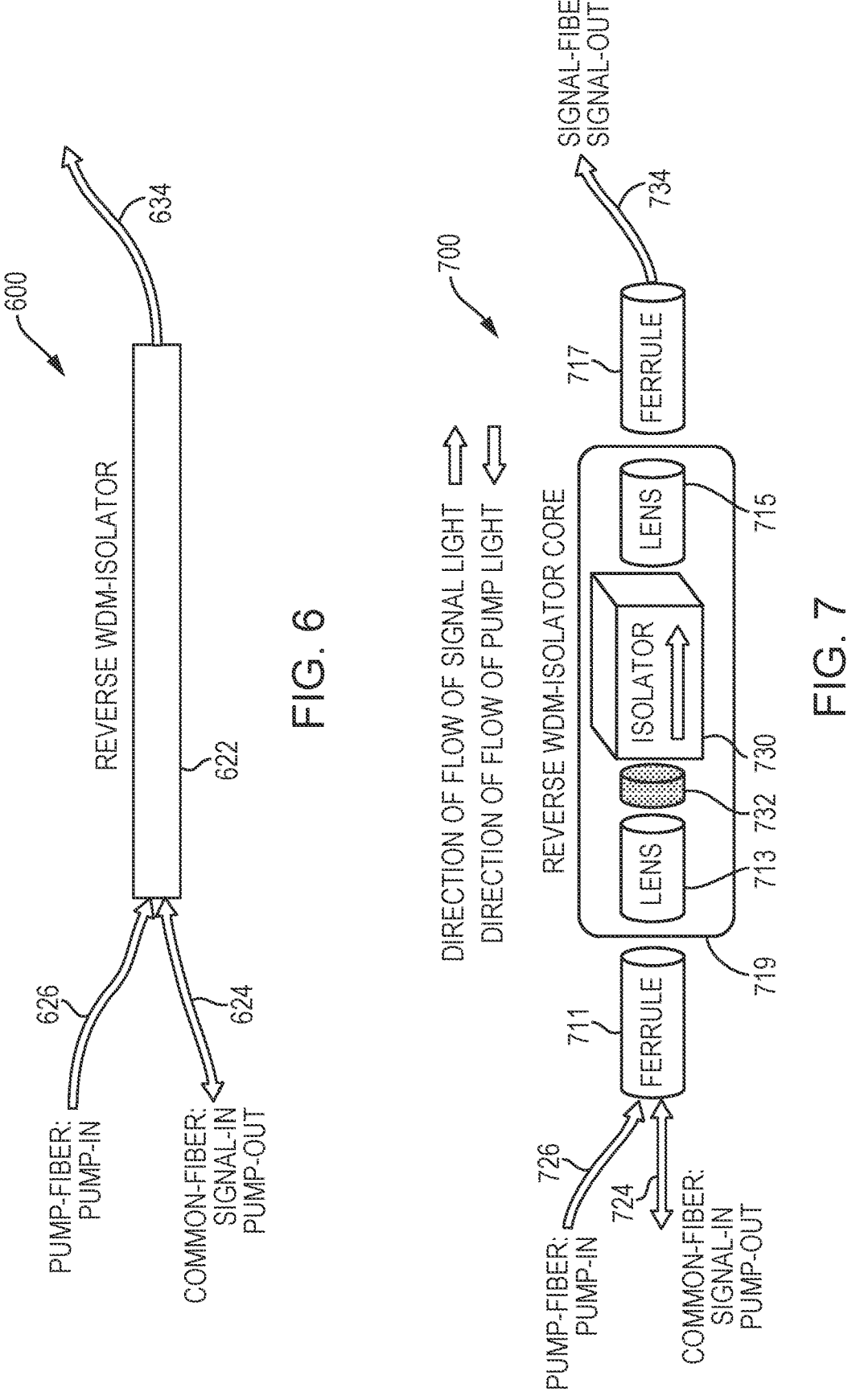
FIG. 6 illustrates a WDM-Isolator optically coupled to a signal-fiber, a pump-fiber, and a common-fiber, according to at least one embodiment of the disclosure.
FIG. 7 is a schematic diagram of WDM-Isolator components, according to at least one embodiment of the disclosure.

FIG. 6 illustrates a counter-propagation system 600 including a reverse WDM-Isolator 622, similar to that of reverse IWDM 222 of FIG. 2, optically coupled to a signal-fiber 634, a pump-fiber 626, and a common-fiber 624, according to at least one embodiment of the disclosure. In at least one embodiment of the disclosure, the signal-fiber 634 is a single mode (SM) optical fiber that allows the propagation of light at a first wavelength $\lambda 1$ of 1550 nm, the pump-fiber 626 is a SM optical fiber that allows the propagation of light at a second wavelength $\lambda 2$ of 980 nm, and the common-fiber 624 is a single mode (SM) optical fiber that enables the propagation of the combined pump and signal light at the first and second wavelengths, $\lambda 1$ of 1550 nm and $\lambda 2$ of 980 nm respectively. As a counter-propagation system, signal-fiber 634 acts as an output for signal light, pump-fiber 626 acts as an input for pump light, and common-fiber 624 acts as an input for signal light and an output for pump light. Similarly, FIG. 7 illustrates a counter-propagation system 700, which is identical to the counter-propagation system 600 of FIG. 6, with an exploded schematic view of several components of the system, according to at least one embodiment of the disclosure. The components include a first ferrule 711, a first lens 713, a WDM filter 732, an isolator 730, a second lens 715, and a second ferrule 717. Altogether, the first lens 713, filter 732, isolator 730, and second lens 715 form a reverse WDM-Isolator core 719. The first ferrule 711 and the second ferrule 717 provide a means for attaching fibers to the reverse WDM-Isolator core 719. The combination of the first ferrule 711, the reverse WDM-Isolator core 719, and the second ferrule 717 form the reverse WDM-Isolator, which is identical to that of the reverse WDM-Isolator 622 in FIG. 6. Similar to the system 600 of FIG. 6, system 700 of FIG. 7 includes signal-fiber 734, pump-fiber 726, and common-fiber 724. As a counter-propagation system as mentioned above, signal-fiber 734 acts as an output for signal light, pump-fiber 726 acts as an input for pump light, and common-fiber 724 acts as an input for signal light and an output for pump light.

Figure 8:
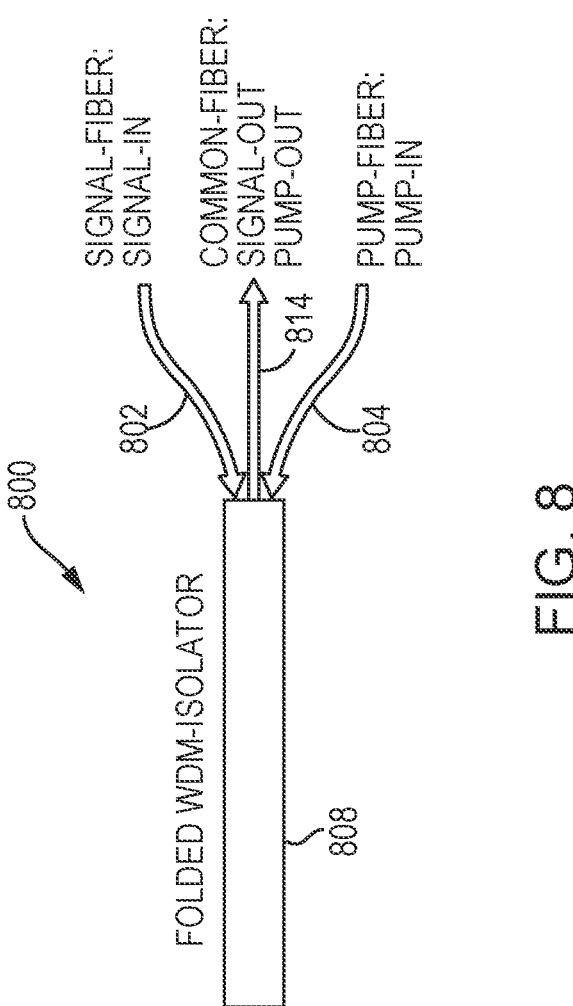
FIG. 8 is a schematic diagram of a folded WDM-Isolator, according to at least one embodiment of the disclosure.

FIG. 8 illustrates a co-propagation system 800 including a folded WDM-Isolator 808 optically coupled to a signal-fiber 802, a pump-fiber 804, and a common-fiber 814, according to at least one embodiment of the disclosure. In this embodiment, the signal-fiber 802 is a single mode (SM) optical fiber that allows the propagation of light at a first wavelength $\lambda 1$ of 1550 nm, the pump-fiber 804 is a SM optical fiber that allows the propagation of light at a second wavelength $\lambda 2$ of 980 nm, and the common-fiber 814 is a single mode (SM) optical fiber that enables the propagation of the combined pump and signal light at the first and second wavelengths, $\lambda 1$ of 1550 nm and $\lambda 2$ of 980 nm respectively. As a co-propagation system as mentioned above, signal-fiber 802 acts as an input for signal light, pump-fiber 804 acts as an input for pump light, and common-fiber 814 acts as an output for both signal light and pump light. Due to the nature of being folded in this embodiment, all three fibers exit the WDM-Isolator 808 on the same side.

Figure 9:
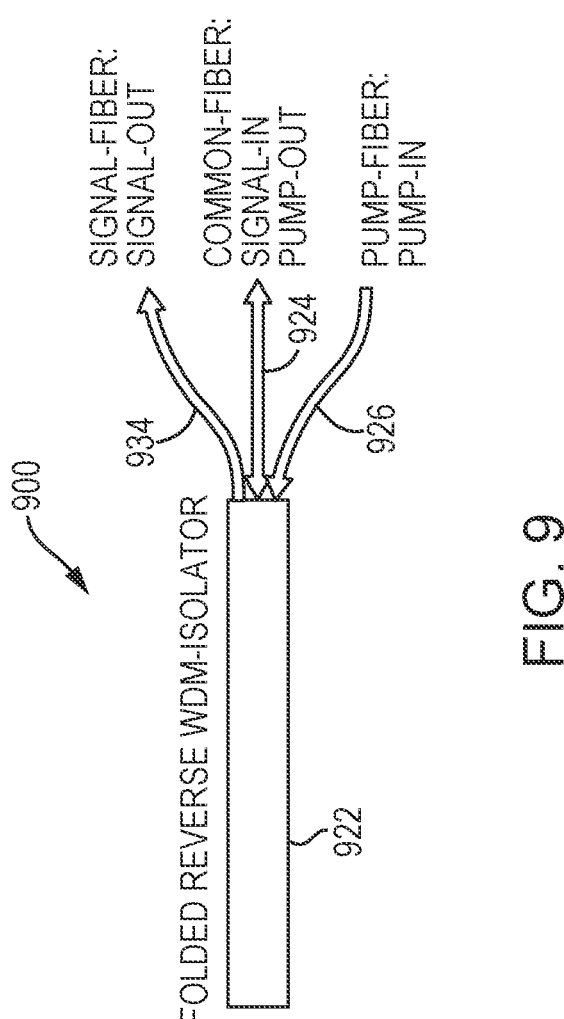
FIG. 9 is a schematic diagram of a folded WDM-Isolator, according to at least one embodiment of the disclosure.

FIG. 9 illustrates a counter-propagation system 900 including a folded reverse WDM-Isolator 922 optically coupled to a signal-fiber 934, a pump-fiber 926, and a common-fiber 924, according to at least one embodiment of the disclosure. In this embodiment, the signal-fiber 934 is a single mode (SM) optical fiber that allows the propagation of light at a first wavelength $\lambda 1$ of 1550 nm, the pump-fiber 926 is a SM optical fiber that allows the propagation of light at a second wavelength $\lambda 2$ of 980 nm, and the common-fiber 924 is a single mode (SM) optical fiber that enables the propagation of the combined pump and signal light at the first and second wavelengths, $\lambda 1$ of 1550 nm and $\lambda 2$ of 980 nm respectively. As a counter-propagation system as mentioned above, signal-fiber 934 acts as an output for signal light, pump-fiber 926 acts as an input for pump light, and common-fiber 924 acts as an input for signal light and an output for pump light. Due to the nature of being folded in this embodiment, all three fibers exit the reverse WDM-Isolator 922 on the same side.

Figure 10:
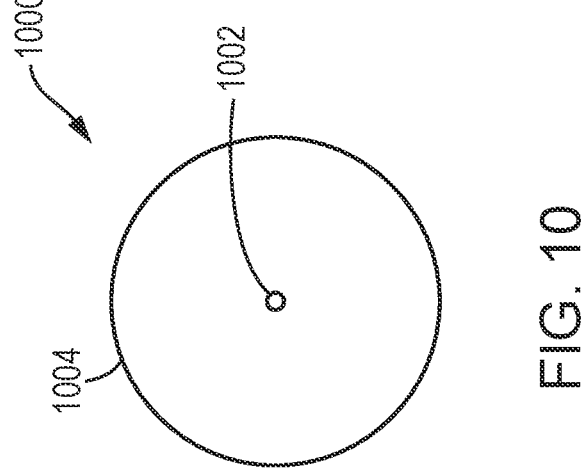
FIG. 10 is a cross-sectional view of an optical fiber comprising a cladding portion surrounding a core portion.

FIG. 10 is a cross-sectional view of an optical fiber 1000 comprising a core portion 1002 and a cladding portion 1004 surrounding the core portion 1002. As known to those having ordinary skill in the art, light propagates in the core portion 1002 which has a much smaller diameter than the cladding portion 1004 surrounding the core portion 1002. Typically, the core portion 1002 can be smaller than the cladding portion 1004 by a factor of ten, though it should be noted that this disclosure is not in any way intended to limit the factor by which the core portion 1002 is smaller than the cladding portion 1004. The size of both the core portion 1002 and the cladding portion 1004 generally differs from one fiber to another. FIG. 10 illustrates the large size difference between the two aforementioned layers of an optical fiber.

Figure 11:
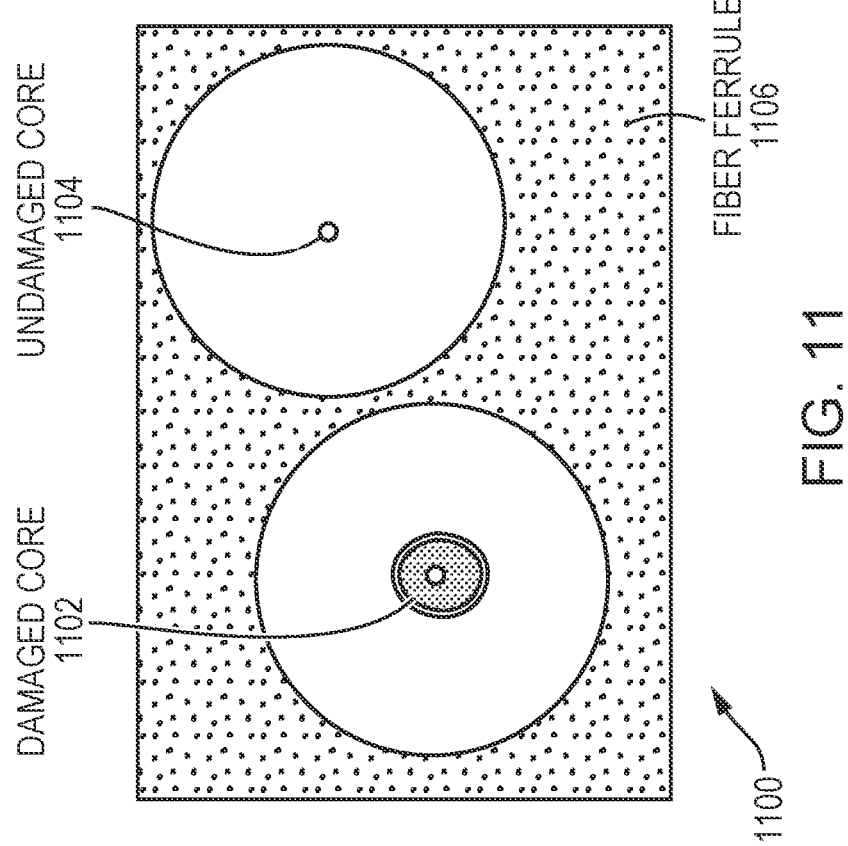
FIG. 11 illustrates a damaged core of an optical pump-fiber (left) and an undamaged core of an optical common-fiber (right).

FIG. 11 illustrates two fibers 1100 positioned within close proximity to one another and surrounded by fiber ferrule 1106. FIG. 11 further illustrates damaged core 1102 of an optical pump-fiber (left) and an undamaged core 1104 of an optical signal-fiber (right). Typically, there will be no damage in the core of the signal-fiber because the intensity of the signal light is low, hence why the signal is being amplified. However, the core of the pump-fiber can be damaged because it has a small core and the pump light carries much more optical power, which causes a high intensity of light at the output aperture of the pump-fiber core portion. This high intensity pump light at the output aperture contributes to the fiber damage. The above-mentioned fiber damage is further discussed herein in the following paragraphs together with FIGS. 12-13.

Figure 12:
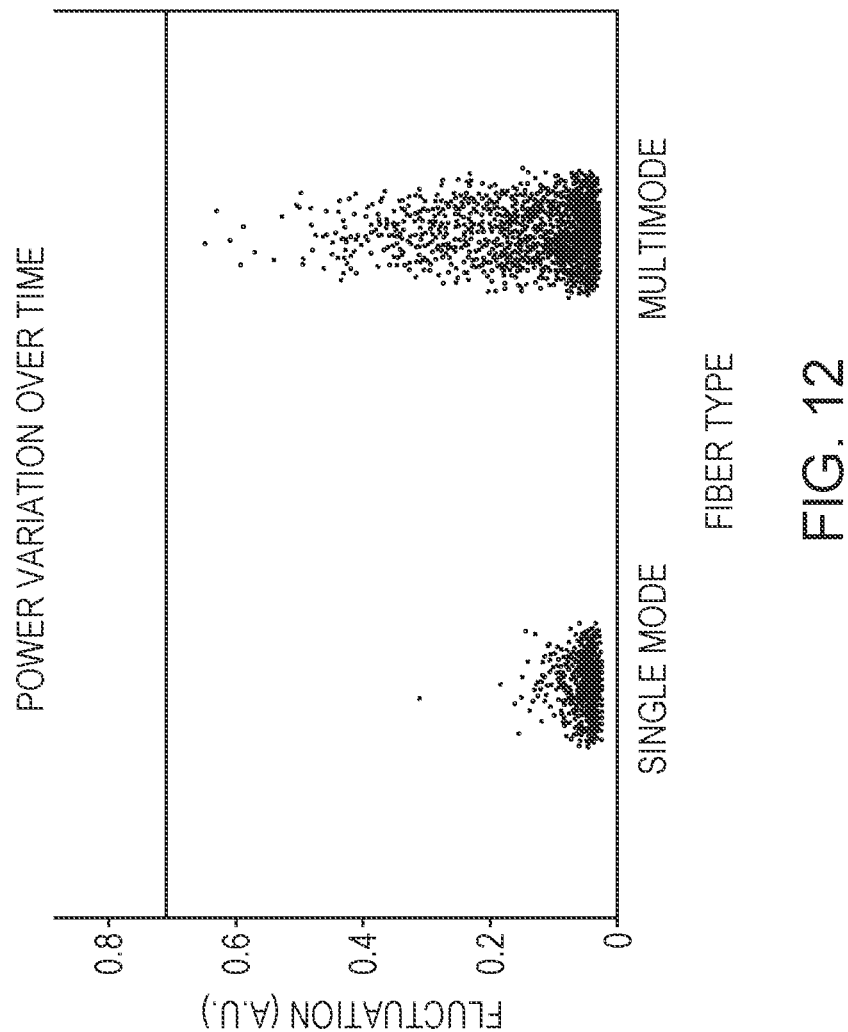
FIG. 12 is a graph illustrating the relative fluctuation in signal-fiber light power for single mode and multimode optical pump-fibers.

FIG. 12 is a graph of the relative power fluctuation (Arbitrary Units) in an amplified signal in the case of a single mode or multimode pump-fiber illustrating that the power fluctuation in the amplified signal light where a multimode pump-fiber is used in the IWDM can be 4 times that in the case where a single mode pump-fiber is used in the IWDM.

Figure 13:
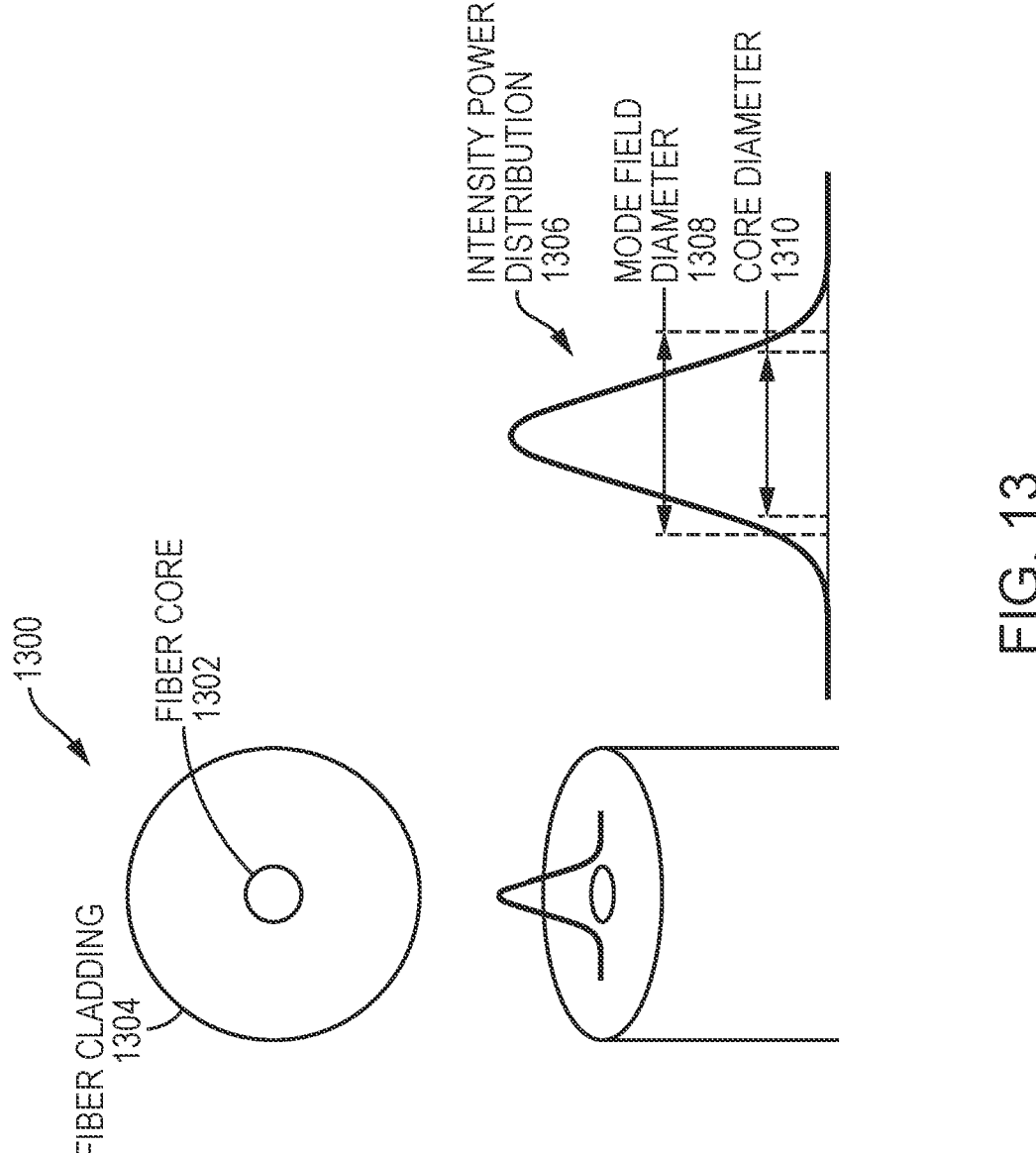
FIG. 13 illustrates the optical power distribution, which propagates through a single mode (SM) optical core portion, as well as a mode field diameter (MFD) and a core diameter.

FIG. 13 illustrates a fiber 1300 including a core portion 1302 and a cladding portion 1304, which surrounds the core portion 1302. FIG. 13 further illustrates the intensity power distribution 1306 as light propagates through the core of a single mode optical fiber, and a relative comparison of a mode field diameter (MFD) 1308 relative to a core diameter 1310. As previously discussed, the light intensity distribution is a direct representation of the light intensity as is propagates through the core portion. It is at the highest peak, or the peak amplitude, where the core portion damage and thus the fiber damage is observed. Finally, the MFD is used to measure the width of a light irradiance distribution. Dividing the total light power by the square of the MFD gives an estimate of the optical intensity in the core portion. One may notice that the MFD is larger than the core diameter. This is simply because the light propagating through the fiber propagates in both the core and cladding.

Figures 14, 15:
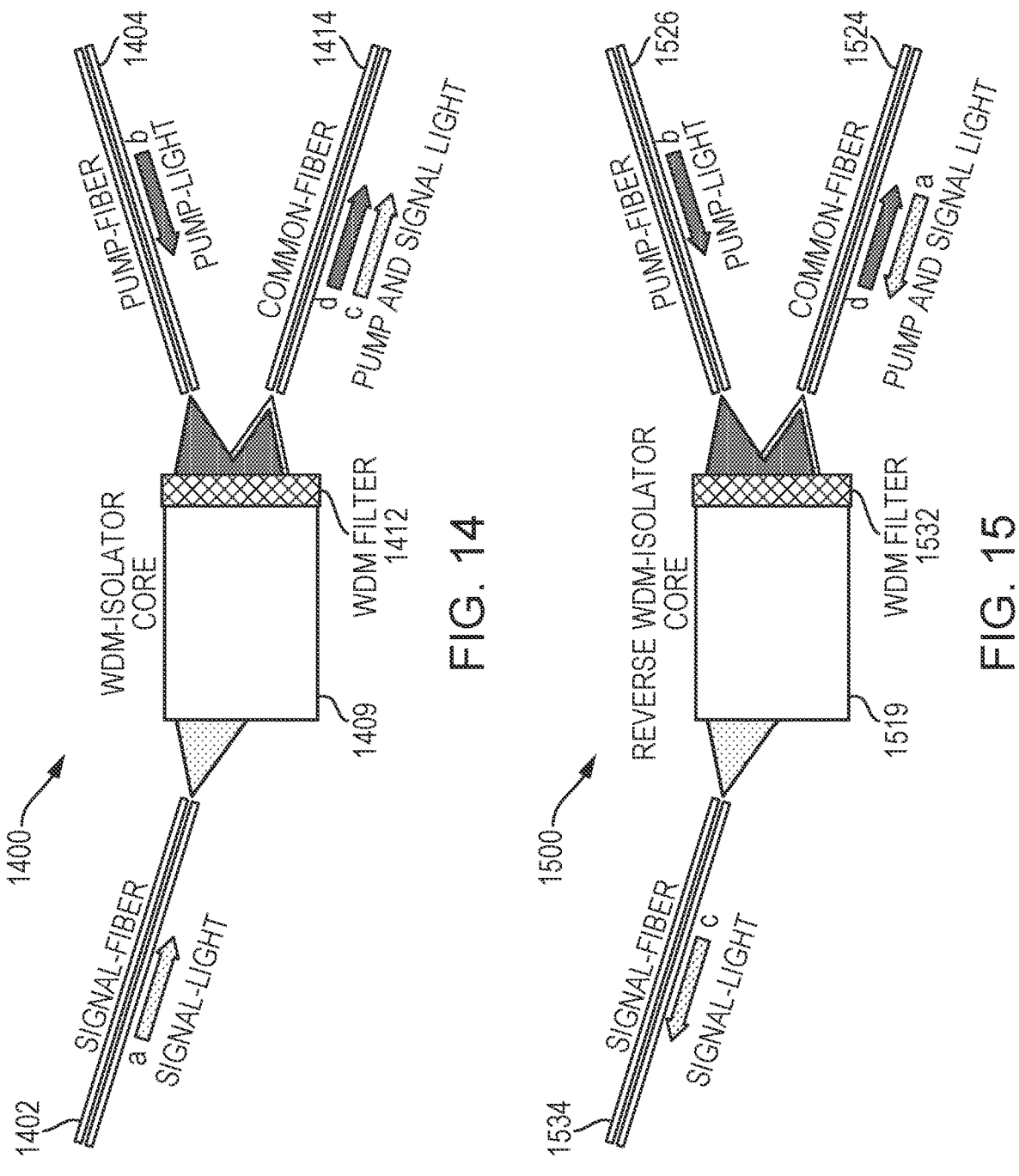
FIG. 14 is an isolator wavelength division multiplexer (IWDM) illustrating signal light in a signal-fiber and pump light in a pump-fiber combined into pump light and signal light in a co-propagating configuration in a common-fiber.
FIG. 15 is an isolator wavelength division multiplexer (IWDM) illustrating signal light in a signal-fiber and pump light in a pump-fiber combined into pump light and signal light in a counter-propagating configuration in a common-fiber.

FIG. 14 illustrates a co-propagation system including an isolator wavelength division multiplexer (IWDM) 1400 illustrating signal light in a signal-fiber 1402 and pump light in a pump-fiber 1404 combined into pump light and signal light in a common-fiber 1414, where both signal light and pump light are travelling in the same direction. As shown in FIG. 14, the signal-fiber 1402 is in line with the common-fiber 1414 such that signal light propagates through the WDM-Isolator core 1409 without being reflected. However, as also shown in FIG. 14, pump light propagating through the pump-fiber 1404 is reflected off the WDM filter 1412 in the WDM-Isolator core 1409 and is combined with the signal light to propagate the combined pump light and signal light in the same direction through the common-fiber 1414. For clarification, labeled arrows have been added to illustrate the direction in which the signal light and pump light propagates. Signal light is denoted by arrows "a" and "c," while pump light is denoted by arrows "b" and "d." In this case, as a co-propagation system, signal light is input by the signal-fiber 1402, pump light is input by the pump-fiber 1404, and both signal light and pump light are output by the common-fiber 1414. It should be noted that this system is well known to those having ordinary skill in the art and is intended only to show the general context for which the present disclosure will be used. That is, the mode, wavelength, core diameter, and MFD of the disclosed photonic system may differ from what is disclosed in FIG. 14.

FIG. 15 illustrates a counter-propagation system including a reverse isolator wavelength division multiplexer (IWDM) 1500 illustrating signal light in a signal-fiber 1534 and pump light in a pump-fiber 1526 combined into pump light and signal light in a common-fiber 1524 where signal light and pump light are travelling in opposite directions. As shown in FIG. 15, the signal-fiber 1534 is in line with the common-fiber 1524 such that signal light propagates through the reverse WDM-Isolator core 1519 without being reflected. However, as also shown in FIG. 15, pump light propagating through the pump-fiber 1526 is reflected off the WDM filter 1532 in the reverse WDM-Isolator core 1519 and is combined with the signal light to propagate the combined pump light and signal light in opposite directions through the common-fiber 1524. For clarification, labeled arrows have been added to illustrate the direction in which the signal light and pump light propagates. Signal light is denoted by arrows "a" and "c," while pump light is denoted by arrows "b" and "d." In this case, as a counter-propagation system, signal light is input by the common-fiber 1524 and output by the signal-fiber 1534, and pump light is input by the pump-fiber 1526 and output by the common-fiber 1524. It should be noted that this system is well known to those having ordinary skill in the art and is intended only to show the general context for which the present disclosure will be used. That is, the mode, wavelength, core diameter, and MFD of the disclosed photonic system may differ from what is disclosed in FIG. 15.

Figures 16, 17:
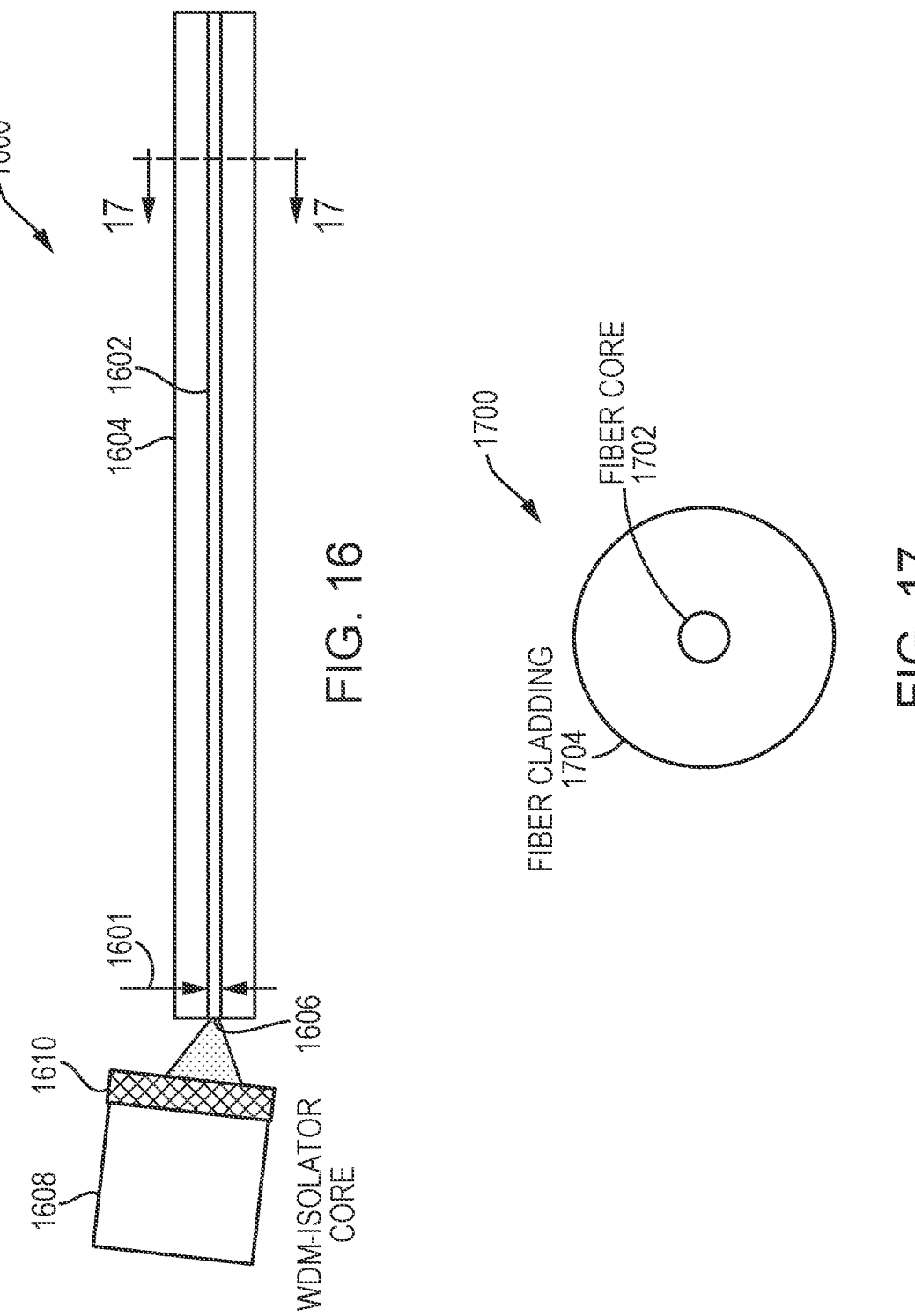
FIG. 16 is a longitudinal sectional view of a conventional pump-fiber comprising a core portion and a cladding portion, wherein the core portion defines a single diameter over a portion of its length including a fiber end-face optically coupled to a WDM-Isolator core, and wherein the fiber end-face is susceptible to fiber damage due to optical power propagated through the pump-fiber.
FIG. 17 is a cross-sectional view of the conventional pump-fiber shown in FIG. 16, taken along section line 17-17 of FIG. 16.

FIG. 16 is a longitudinal sectional view of a conventional pump-fiber 1600 comprising a core portion 1602 and a cladding portion 1604, wherein the core portion 1602 defines a single diameter 1601 over a portion of its length including a fiber end-face 1606 optically coupled to a WDM-Isolator core 1608 including a WDM filter 1610, and wherein the fiber end-face 1606 is susceptible to fiber damage due to optical power propagated through the pump-fiber 1600. FIG. 17 is a cross-sectional view of the pump-fiber 1600, taken along section 17-17 of FIG. 16. FIG. 17 illustrates a cross-sectional view of pump-fiber 1700, which is identical to pump-fiber 1600 of FIG. 16, including a core portion 1702 and a cladding portion 1704 that surrounds the core portion 1702.

With reference now to FIGS. 16 and 17, the core portion of the conventional pump-fiber defines a diameter of a size that makes it susceptible to fiber damage at the tip of the fiber where the light exits the pump-fiber. The pump-fiber is a SM optical fiber at a wavelength of 980 nm, and the core diameter and MFD are in the range of 4-11 μm. The pump-fiber comprises a cladding portion surrounding the core portion. The core portion, and thus the MFD, shown in FIG. 16 receives high intensity pump light leaving it susceptible to fiber damage as the light exits the fiber. The configuration of the pump-fiber core portion shown in FIG. 16 is advantageous for maintaining power stability, but it is rendered susceptible to fiber damage. Accordingly, an improvement is needed such that the pump light intensity exiting the pump-fiber core portion is reduced in order to reduce the pump-fiber core portion damage while also maintaining power stability.

Figure 18:
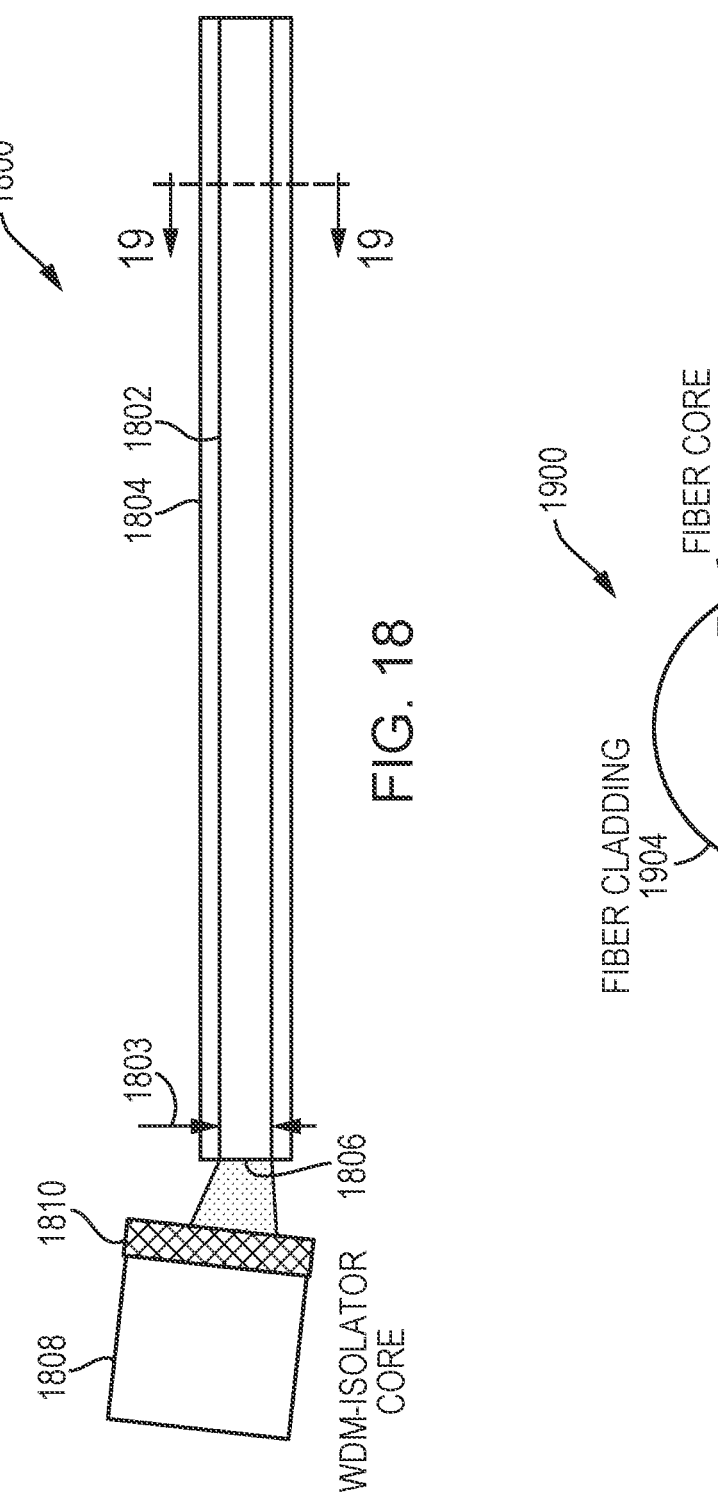
FIG. 18 is a longitudinal sectional view of a conventional pump-fiber comprising a core portion and a cladding portion, wherein the core portion defines a single diameter over a portion of its length including a fiber end-face optically coupled to a WDM-Isolator core, wherein the diameter of the core portion is greater than the diameter of the core portion of the conventional pump-fiber shown in FIG. 16, and wherein the larger core fiber makes the pump-fiber multimode at the pump light wavelength and the pump-fiber end-face is susceptible to increasing power instability.
Figure 19:
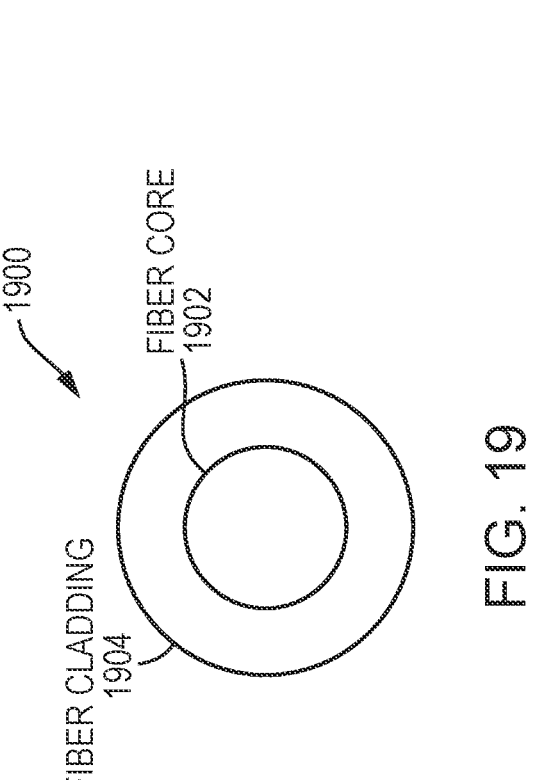
FIG. 19 is a cross-sectional view of the conventional pump-fiber shown in FIG. 18, taken along section line 19-19 of FIG. 18.

FIG. 18 is a longitudinal sectional view of a conventional pump-fiber 1800 comprising a core portion 1802 and a cladding portion 1804, wherein the core portion 1802 defines a single diameter 1803 over a portion of its length including a fiber end-face 1806 optically coupled to a WDM-Isolator core 1808 including a WDM filter 1810, and wherein the diameter 1803 of the core portion 1802 is greater than the diameter 1601 of the core portion 1602 of the conventional pump-fiber 1600 shown in FIG. 16, and wherein the optical power is susceptible to increasing power instability. FIG. 19 is a cross-sectional view of the pump-fiber, taken along section 19-19 of FIG. 18. FIG. 19 illustrates a cross-sectional view of pump-fiber 1900, which is identical to pump-fiber 1800 of FIG. 18, including a core portion 1902 and a cladding portion 1904 that surrounds the core portion 1902.

With reference now to FIGS. 18 and 19, a different conventional pump-fiber from the one shown in FIG. 16 is used and comprises a larger core that makes it susceptible to increasing power fluctuation. The pump-fiber is a MM optical fiber at a wavelength of 980 nm, and the core diameter and the MFD are in the range of 4-11 μm. The pump-fiber comprises a cladding portion surrounding the core portion. The light power in the fiber shown in FIG. 18 can propagate in a MM configuration which causes the distribution of light in the pump-fiber to fluctuate. The configuration of the pump-fiber core portion shown in FIG. 18 is advantageous for reducing pump light intensity at the tip of the fiber where the light power exits the fiber, thus reducing pump-fiber core portion damage. However, the configuration of the pump-fiber core portion shown in FIG. 18 is rendered susceptible to power instability of the signal power as it exits the amplifier. Accordingly, an improvement is needed such that power stability of the amplified signal can be maintained while also reducing pump light intensity as the pump light exits the pump-fiber core portion in order to reduce pump-fiber core portion damage.

Figures 20, 21:
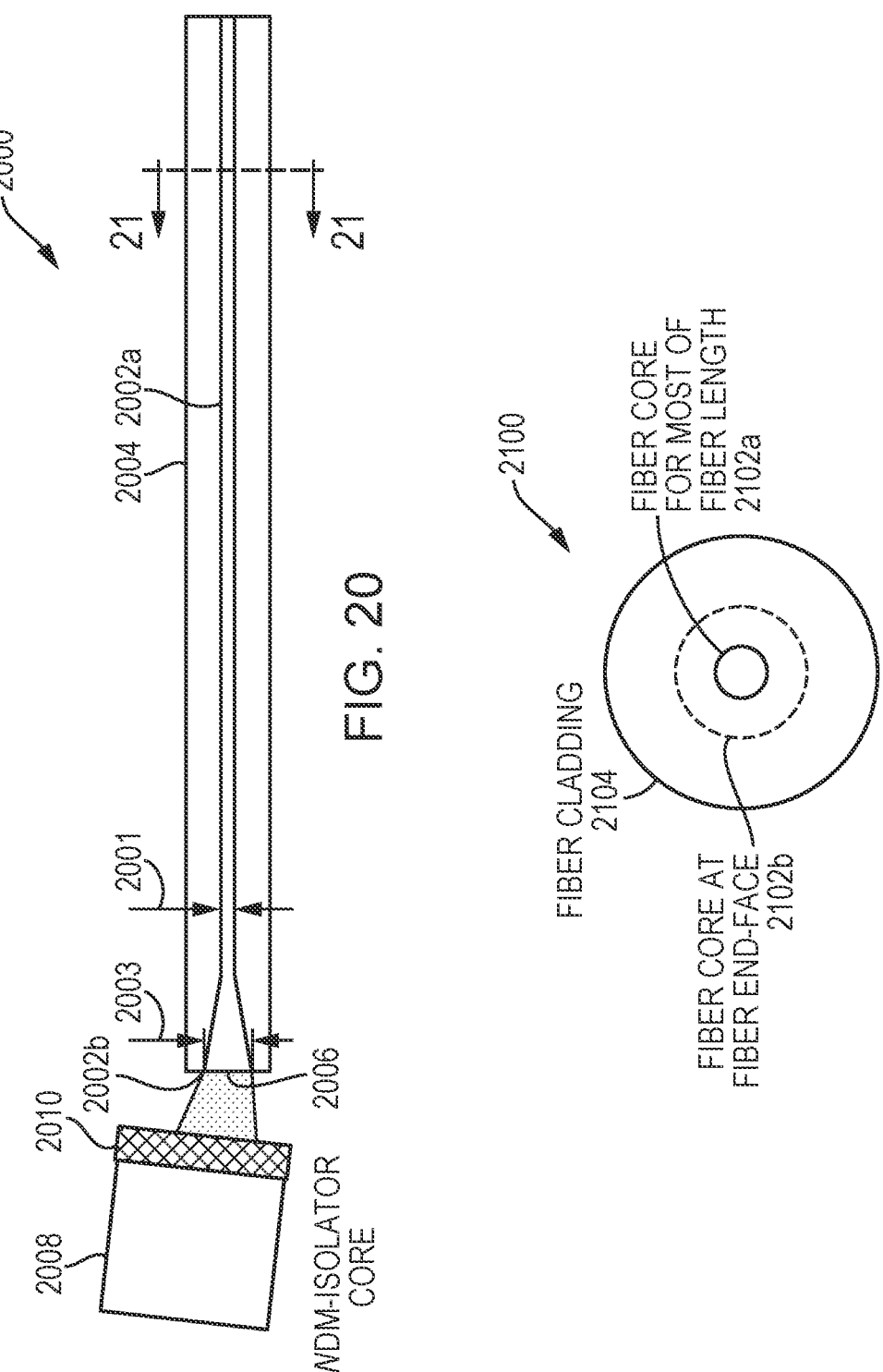
FIG. 20 is a longitudinal sectional view of a pump-fiber comprising a core portion and a cladding portion, wherein the core portion defines a first diameter over a portion of its length and a second diameter at a fiber end-face optically coupled to a WDM-Isolator core, wherein the second diameter is greater than the first diameter to define an expanded tip, and wherein the fiber end-face is less susceptible to both fiber damage and increasing power instability, according to an exemplary embodiment of the disclosure.
FIG. 21 is a cross-sectional view of the pump-fiber shown in FIG. 20, taken along section line 21-21 of FIG. 20, according to an exemplary embodiment of the disclosure.

FIG. 20 is a longitudinal sectional view of a pump-fiber 2000 comprising a core portion 2002a/2002b and a cladding portion 2004, wherein the core portion 2002a/2002b defines a first diameter 2001 over a portion of its length and a second diameter 2003 at a fiber end-face 2006 optically coupled to a WDM-Isolator core 2008 including a WDM filter 2010, wherein the second diameter 2003 is greater than the first diameter 2001 to define an expanded tip, and wherein the fiber end-face 2006 is less susceptible to both fiber damage and the signal power exiting the amplifier has lower power instability, according to an exemplary embodiment of the disclosure. FIG. 21 is a cross-sectional view of the pump-fiber, taken along section 21-21 of FIG. 20. FIG. 21 illustrates a cross-sectional view of pump-fiber 2100, which is identical to pump-fiber 2000 of FIG. 20, including a first core portion 2102a for most of the fiber length, a second core portion 2102b at the fiber end-face, such as the fiber end-face 2006 of FIG. 20, and a cladding portion 2104 that surrounds the first and second core portions 2102a/2102b.

With reference now to FIGS. 20 and 21, the pump-fiber comprises a cladding portion surrounding the core portion with an expanded tip, according to an exemplary embodiment of the disclosure. The pump-fiber is mostly a SM optical fiber at a wavelength of 980 nm, and the core diameter and MFD are in the range of 4-11 μm. The pump-fiber near the fiber end-face is beam expanded, and the core diameter and MFD are in the range of 4-11 μm. While the pump-fiber near the fiber end-face can be a MM optical fiber, it only propagates a SM because the higher order modes are never excited as the fiber end-face is kept straight and the core transition from the first diameter to the second larger diameter is substantially adiabatic. The portion of the core portion defined by the first diameter contributes to maintaining signal power stability while the portion of the core portion defined by the second diameter contributes to reducing the pump light intensity on the fiber end-face and thus contributes to reducing the pump-fiber core portion damage.

Figure 22:
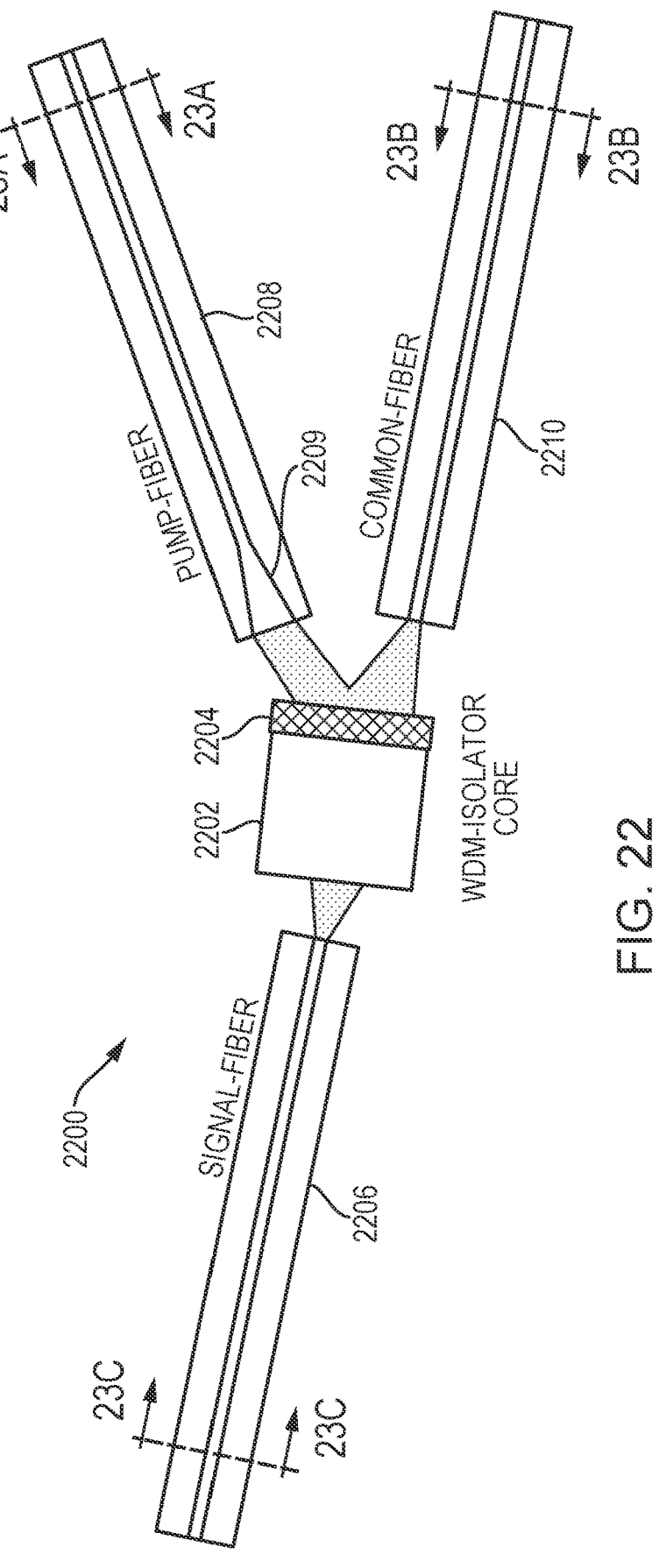
FIG. 22 is an IWDM core illustrating a signal-fiber, a pump-fiber with an expanded tip, and a common-fiber, according to at least one embodiment of the disclosure.
Figures 23A, 23B, 23C:
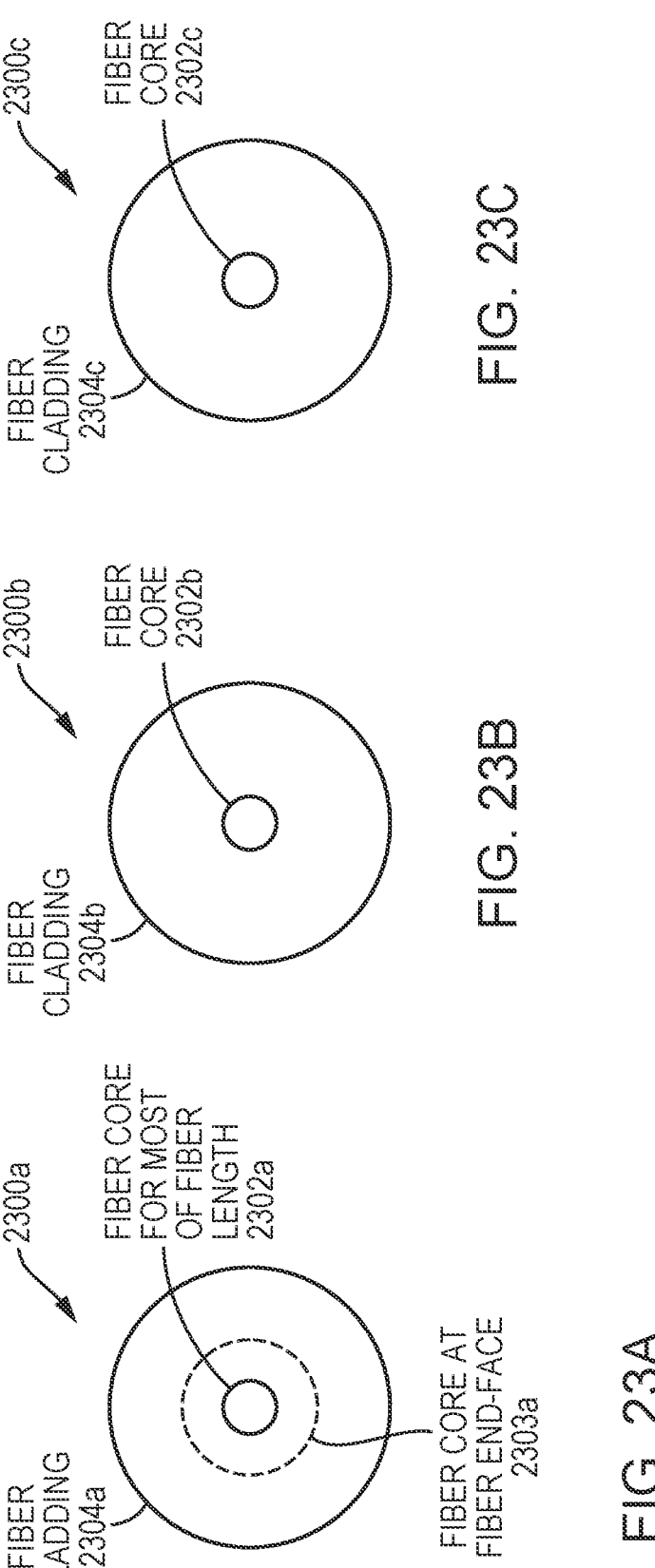
FIG. 23a is a cross-sectional view of the pump-fiber shown in FIG. 22, taken along section line 23A-23A of FIG. 22, according to at least one embodiment of the disclosure.
FIG. 23b is a cross-sectional view of the common-fiber shown in FIG. 22, taken along section line 23B-23B of FIG. 22, according to at least one embodiment of the disclosure.
FIG. 23c is a cross-sectional view of the signal-fiber shown in FIG. 22, taken along section line 23C-23C of FIG. 22, according to at least one embodiment of the disclosure.

FIG. 22 illustrates a system 2200 including a WDM-Isolator core 2202 including a WDM filter 2204. FIG. 22 further illustrates a signal-fiber 2206, a pump-fiber 2208 having an expanded tip 2209, and a common-fiber 2210, according to at least one embodiment of the disclosure. FIG. 23A is a cross-sectional view 2300a of the pump-fiber 2208, taken along section 23A-23A of FIG. 22, that illustrates a first core portion 2302a for most of the fiber length, a second core portion 2303a at the fiber end-face, and a cladding portion 2304a that surrounds the first and second core portions 2302a/2303a, according to at least one embodiment of the disclosure. FIG. 23B is a cross-sectional view 2300b of the common-fiber 2210, taken along section line 23B-23B of FIG. 22, that illustrates a core portion 2302b and a cladding portion 2304b that surrounds the core portion 2302b, according to at least one embodiment of the disclosure. FIG. 23C is a cross-sectional view 2300c of the signal-fiber 2206, taken along section line 23C-23C of FIG. 22, that illustrates a core portion 2302c and a cladding portion 2304c that surrounds the core portion 2302c, according to at least one embodiment of the disclosure.

With reference to FIGS. 22-23C, a signal light input and a pump light input are combined at the WDM-Isolator core 2202 to form a common light output. As shown in FIG. 22, the signal-fiber 2206 is substantially in line with the common-fiber 2210 such that signal light propagates through the WDM-Isolator core 2202 without being reflected. The pump light propagating through the pump-fiber 2208 is reflected off of the WDM filter 2204 of the WDM-Isolator core 2202 and is combined with the signal light to propagate the combined pump and signal light in the same direction through the common-fiber 2210. It should be noted that this system is representative of at least one embodiment of the present disclosure and may differ accordingly for separate embodiments disclosed herein.

FIGS. 24-29 altogether form the basis of at least one embodiment of the present disclosure. It should be noted, as is well known to those having ordinary skill in the art, that the following optical fibers described herein below are to be configured in such a manner as described in FIG. 14 or FIG. 15.

FIG. 24 is a longitudinal sectional view of a signal-fiber 2400 comprising a core portion 2402 and a cladding portion 2404, wherein the core portion 2402 defines a single diameter 2401 over a portion of its length including a fiber end-face 2406 optically coupled to a WDM-Isolator core 2408 including a WDM filter 2410, according to at least one embodiment of the disclosure. FIG. 25 is a cross-sectional view 2500 of the signal-fiber 2400, taken along section line 25-25 of FIG. 24, according to at least one embodiment of the disclosure. The signal-fiber comprises a cladding portion 2504 surrounding the core portion 2502, which is equivalent to the cladding portion 2404 surrounding the core portion 2402 in FIG. 24, according to at least one embodiment of the disclosure. The signal-fiber is a SM optical fiber at a wavelength of 1550 nm, and the core diameter and MFD are in the range of 4-11 μm.

FIG. 26 is a longitudinal sectional view of a common-fiber 2600 comprising a core portion 2602 and a cladding portion 2604, wherein the core portion 2602 defines a single diameter 2601 over a portion of its length including a fiber end-face 2606 optically coupled to a WDM-Isolator core 2608 including a WDM filter 2610, according to at least one embodiment of the disclosure. FIG. 27 is a cross-sectional view 2700 of the common-fiber 2600, taken along section line 27-27 of FIG. 26, according to at least one embodiment of the disclosure. The common-fiber comprises a cladding portion 2704 surrounding the core portion 2702, which is equivalent to the cladding portion 2604 surrounding the core portion 2602 in FIG. 26, according to at least one embodiment of the disclosure. The common-fiber is a SM optical fiber at a wavelength of 1550 nm and a MM optical fiber at a wavelength of 980 nm, and the core diameter and MFD are in the range of 4-11 μm.

FIG. 28 is a longitudinal section view of a pump-fiber 2800 comprising core portions 2802a/2802b and a cladding portion 2804, wherein the core portion 2802a defines a first diameter 2801 over a portion of its length and wherein the core portion 2802b defines a second diameter 2803 at a fiber end-face 2806 optically coupled to a WDM-Isolator core 2808 including a WDM filter 2810, wherein the second diameter 2803 is greater than the first diameter 2801 to define an expanded tip 2812, and wherein the diameters 2401/2601 of the core portions 2402/2602 of the signal-fiber 2400 and the common-fiber 2600 shown in FIGS. 24-27 are substantially the same as the first diameter 2801 of the core portion 2802a of the pump-fiber 2800, according to at least one embodiment of the disclosure.

FIG. 29 is a cross-sectional view 2900 of the pump-fiber 2800, taken along section 29-29 of FIG. 28. The pump-fiber comprises a cladding portion 2904 surrounding the core portions 2902a/2902b, which is equivalent to the cladding portion 2804 surround the core portions 2902a/2802b in FIG. 28, according to at least one embodiment of the disclosure. The pump-fiber is mostly a SM optical fiber at a wavelength of 980 nm, and the core diameter and MFD are in the range of 4-11 μm. The pump-fiber near the fiber end-face is a MM optical fiber at a wavelength of 980 nm, and the core diameter and MFD are in the range of 4-11 μm. While the pump-fiber near the fiber end-face is a MM optical fiber, only the fundamental mode is excited in the optical fiber because the fiber is kept straight, and the transition of the core from first diameter to the second larger diameter is adiabatic, hence, higher order modes are substantially not excited. The portion of the core portion defined by the first diameter contributes to maintaining signal power stability while the portion of the core portion defined by the second diameter contributes to reducing the pump light intensity on the fiber end-face and thus contributes to reducing pump-fiber core portion damage.

FIGS. 30-35 altogether form the basis of at least one embodiment of the present disclosure. It should be noted, as is well known to those having ordinary skill in the art, that the following optical fibers described herein below are to be configured in such a manner as described in FIG. 14 and FIG. 15.

FIG. 30 is a longitudinal sectional view of a signal-fiber 3000 comprising a core portion 3002 and a cladding portion 3004, wherein the core portion 3002 defines a single diameter 3003 over a portion of its length including a fiber end-face 3006 optically coupled to a WDM-Isolator core 3008 including a WDM filter 3010, according to at least one embodiment of the disclosure. FIG. 31 is a cross-sectional view 3100 of the signal-fiber 3000, taken along section line 31-31 of FIG. 30, according to at least one embodiment of the disclosure. The signal-fiber comprises a cladding portion 3104 surrounding the core portion 3102, which is equivalent to the cladding portion 3004 surrounding the core portion 3002 in FIG. 30, according to at least one embodiment of the disclosure. The signal-fiber is a SM optical fiber at a wavelength of 1550 nm, and the core diameter and MFD are in the range of 4-11 μm.

FIG. 32 is a longitudinal sectional view of a common-fiber 3200 comprising a core portion 3202 and a cladding portion 3204, wherein the core portion 3202 defines a single diameter 3203 over a portion of its length including a fiber end-face 3206 optically coupled to a WDM-Isolator core 3208 including a WDM filter 3210, according to at least one embodiment of the disclosure. FIG. 33 is a cross-sectional view 3300 of the common-fiber 3200, taken along section 33-33 of FIG. 32. The common-fiber comprises a cladding portion 3304 surrounding the core portion 3302, which is equivalent to the cladding portion 3204 surrounding the core portion 3202 in FIG. 32, according to at least one embodiment of the disclosure. The common-fiber is a SM optical fiber at a wavelength of 1550 nm and a MM optical fiber at a wavelength of 980 nm, and the core diameter and MFD are in the range of 4-11 μm.

FIG. 34 is a longitudinal sectional view of a pump-fiber 3400 comprising core portions 3402a/3402b and a cladding portion 3404, wherein the core portion 3402a defines a first diameter 3401 over a portion of its length and wherein the core portion 3402b defines a second diameter 3403 at a fiber end-face 3406 optically coupled to a WDM-Isolator core 3408 including a WDM filter 3410, wherein the second diameter 3403 is greater than the first diameter 3401 to define an expanded tip 3412, and wherein the diameters 3003/3203 of the core portions 3002/3202 of the signal-fiber 3000 and common-fiber 3200 shown in FIGS. 30-33 are greater than the first diameter 3401 of the core portion 3402a of the pump-fiber 3400, according to at least one embodiment of the disclosure. FIG. 35 is a cross-sectional view 3500 of the pump-fiber 3400, taken along section 35-35 of FIG. 34. The pump-fiber comprises a cladding portion 3504 surrounding the core portions 3502a/3502b, which is equivalent to the cladding portion 3404 surrounding the core portions 3402a/3402b in FIG. 34, according to at least one embodiment of the disclosure. The pump-fiber is mostly a SM optical fiber at a wavelength of 980 nm, and the core diameter and MFD are in the range of 4-11 μm. The pump-fiber near the fiber end-face is a MM optical fiber at a wavelength of 980 nm, and the core diameter and MFD are in the range of 4-11 μm. While the pump-fiber near the fiber end-face is a MM optical fiber, only the fundamental mode is excited in the optical fiber because the fiber is kept straight, and the transition of the core from first diameter to the second larger diameter is adiabatic, hence, higher order modes are substantially not excited. The portion of the core portion defined by the first diameter contributes to maintaining signal power stability while the portion of the core portion defined by the second diameter contributes to reducing the pump light intensity on the fiber end-face and thus contributes to reducing the pump-fiber core portion damage.

FIGS. 36-41 altogether form the basis of at least one embodiment of the present disclosure. It should be noted, as is well known to those having ordinary skill in the art, that the following optical fibers described herein below are to be configured in such a manner as described in FIGS. 14 and 15.

Figures 36, 37, 38, 39, 40, 41:
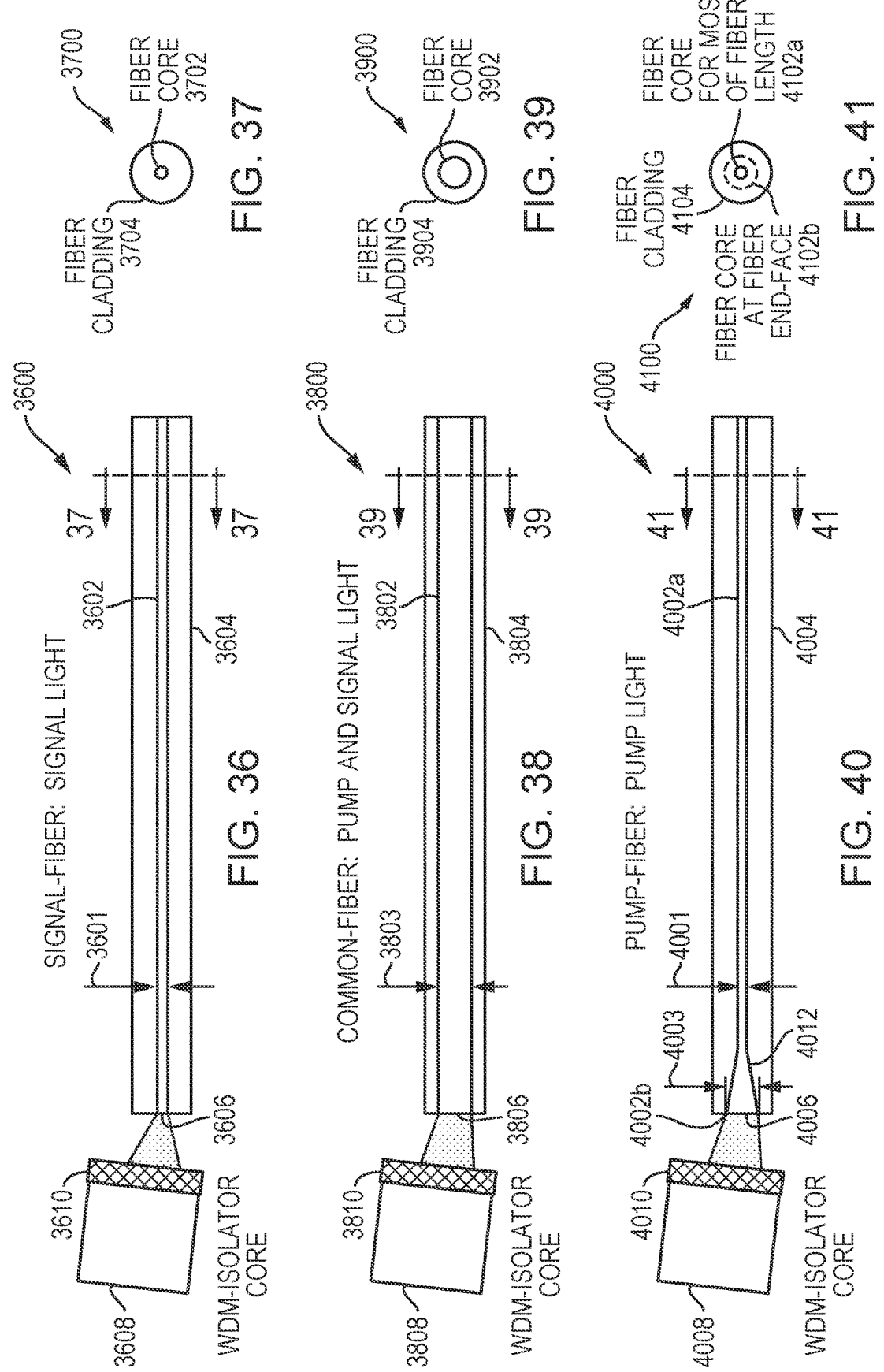
FIG. 36 is a longitudinal sectional view of a signal-fiber comprising a core portion and a cladding portion, wherein the core portion defines a single diameter over a portion of its length and a fiber end-face optically coupled to a WDM-Isolator core, according to at least one embodiment of the disclosure.
FIG. 37 is a cross-sectional view of the signal-fiber shown in FIG. 36, taken along section line 37-37 of FIG. 36, according to at least one embodiment of the disclosure.
FIG. 38 is a longitudinal sectional view of a common-fiber comprising a core portion and a cladding portion, wherein the core portion defines a single diameter over a portion of its length including a fiber end-face optically coupled to a WDM-Isolator core, wherein the diameter of the core portion of the signal-fiber shown in FIG. 36 is less than the diameter of the core portion of the common-fiber, according to at least one embodiment of the disclosure.
FIG. 39 is a cross-sectional view of the common-fiber shown in FIG. 38, taken along section line 39-39 of FIG. 38, according to at least one embodiment of the disclosure.
FIG. 40 is a longitudinal sectional view of a pump-fiber comprising a core portion and a cladding portion, wherein the core portion defines a first diameter over a portion of its length and a second diameter at a fiber end-face optically coupled to a WDM-Isolator core, wherein the second diameter is greater than the first diameter to define an expanded tip, and wherein the diameter of the core portion of the common-fiber shown in FIG. 38 is greater than the first diameter of the core portion of the pump-fiber, according to at least one embodiment of the disclosure.
FIG. 41 is a cross-sectional view of the pump-fiber shown in FIG. 40, taken along section line 41-41 of FIG. 40, according to at least one embodiment of the disclosure.

FIG. 36 is a longitudinal sectional view of a signal-fiber 3600 comprising a core portion 3602 and a cladding portion 3604, wherein the core portion 3602 defines a single diameter 3601 over a portion of its length and a fiber end-face 3606 optically coupled to a WDM-Isolator core 3608 including a WDM filter 3610, according to at least one embodiment of the disclosure. FIG. 37 is a cross-sectional view 3700 of the signal-fiber 3600, taken along section 37-37 of FIG. 36. The signal-fiber comprises a cladding portion 3704 surrounding the core portion 3702, which is equivalent to the cladding portion 3604 surrounding the core portion 3602 in FIG. 36, according to at least one embodiment of the disclosure. The signal-fiber is a SM optical fiber at a wavelength of 1550 nm, and the core diameter and MFD are in the range of 4-11 μm.

FIG. 38 is a longitudinal sectional view of a common-fiber 3800 comprising a core portion 3802 and a cladding portion 3804, wherein the core portion 3802 defines a single diameter 3803 over a portion of its length including a fiber end-face 3806 optically coupled to a WDM-Isolator core 3808 including a WDM filter 3810, wherein the diameter 3601 of the core portion 3602 of the signal-fiber 3600 shown in FIG. 36 is less than the diameter 3803 of the core portion 3802 of the common-fiber 3800, according to at least one embodiment of the disclosure. FIG. 39 is a cross-sectional view 3900 of the common-fiber 3800, taken along section 39-39 of FIG. 38. The common-fiber comprises a cladding portion 3904 surrounding the core portion 3902, which is equivalent to the cladding portion 3804 surrounding the core portion 3802 in FIG. 38, according to at least one embodiment of the disclosure. The common-fiber is a SM optical fiber at a wavelength of 1550 nm and a MM optical fiber at a wavelength of 980 nm, and the core diameter and MFD are in the range of 4-11 μm.

FIG. 40 is a longitudinal sectional view of a pump-fiber 4000 comprising core portions 4002a/4002b and a cladding portion 4004, wherein the core portion 4002a defines a first diameter 4001 over a portion of its length and wherein the core portion 4002*b* defines a second diameter 4003 at a fiber end-face 4006 optically coupled to a WDM-Isolator core 4008 including a WDM filter 4010, wherein the second diameter 4003 is greater than the first diameter 4001 to define an expanded tip 4012, and wherein the diameter 3803 of the core portion 3802 of the common-fiber 3800 shown in FIG. 38 is greater than the first diameter 4001 of the core portion 4002*a* of the pump-fiber 4000, according to at least one embodiment of the disclosure. FIG. 41 is a cross-sectional view 4100 of the pump-fiber 4000, taken along section 41-41 of FIG. 40. The pump-fiber comprises a cladding portion 4104 surrounding the core portions 4102*a*/4102*b*, which is equivalent to the cladding portion 4004 surrounding the core portions 4002*a*/4002*b* in FIG. 40, according to at least one embodiment of the disclosure. The pump-fiber is mostly a SM optical fiber at a wavelength of 980 nm, and the core diameter and MFD are in the range of 4-11 μm. The pump-fiber near the fiber end-face is a MM optical fiber at a wavelength of 980 nm, and the core diameter and MFD are in the range of 4-11 μm. While the pump-fiber near the fiber end-face is a MM optical fiber, only the fundamental mode is excited in the optical fiber because the fiber is kept straight, and the transition of the core from first diameter to the second larger diameter is adiabatic, hence, higher order modes are substantially not excited. The portion of the core portion defined by the first diameter contributes to maintaining signal power stability while the portion of the core portion defined by the second diameter contributes to reducing the pump light intensity on the fiber end-face and thus contributes to reducing the pump-fiber core portion damage.

FIGS. 42-47 altogether form the basis of at least one embodiment of the present disclosure. It should be noted, as is well known to those having ordinary skill in the art, that the following optical fibers described herein below are to be configured in such a manner as described in FIG. 14 and FIG. 15.

FIG. 42 is a longitudinal sectional view of a signal-fiber 4200 comprising a core portion 4202 and a cladding portion 4204, wherein the core portion 4202 defines a single diameter 4203 over a portion of its length including a fiber end-face 4206 optically coupled to a WDM-Isolator core 4208 including a WDM filter 4210, according to at least one embodiment of the disclosure. FIG. 43 is a cross-sectional view 4300 of the signal-fiber 4200, taken along section 43-43 of FIG. 42. The signal-fiber comprises a cladding portion 4304 surrounding the core portion 4302, which is equivalent to the cladding portion 4204 surrounding the core portion 4202 in FIG. 42, according to at least one embodiment of the disclosure. The signal-fiber is a SM optical fiber at a wavelength of 1550 nm, and the core diameter and MFD are in the range of 4-11 μm.

FIG. 44 is a longitudinal sectional view of a common-fiber 4400 comprising a core portion 4402 and a cladding portion 4404, wherein the core portion 4402 defines a single diameter 4401 over a portion of its length including a fiber end-face 4406 optically coupled to a WDM-Isolator core 4408 including a WDM filter 4410, wherein the diameter 4203 of the core portion 4202 of the signal-fiber 4200 shown in FIG. 42 is greater than the diameter 4401 of the core portion 4402 of the common-fiber 4400, according to at least one embodiment of the disclosure. FIG. 45 is a cross-sectional view 4500 of the common-fiber 4400, taken along section 45-45 of FIG. 44. The common-fiber comprises a cladding portion 4504 surrounding the core portion 4502, which is equivalent to the cladding portion 4404 surrounding the core portion 4402 in FIG. 44, according to at least one embodiment of the disclosure. The common-fiber is a SM optical fiber at a wavelength of 1550 nm and a MM optical fiber at a wavelength of 980 nm, and the core diameter and MFD are in the range of 4-11 μm.

FIG. 46 is a longitudinal sectional view of a pump-fiber 4600 comprising core portions 4602*a*/4602*b* and a cladding portion 4604, wherein the core portion 4602*a* defines a first diameter 4601 over a portion of its length and wherein core portion 4602*b* defines a second diameter 4603 at a fiber end-face 4606 optically coupled to a WDM-Isolator core 4608 including a WDM filter 4610, wherein the second diameter 4603 is greater than the first diameter 4601 to define an expanded tip 4612, and wherein the diameter 4203 of the signal-fiber 4200 shown in FIG. 42 is greater than the first diameter 4601 of the pump-fiber 4600, according to at least one embodiment of the disclosure. FIG. 47 is a cross-sectional view 4700 of the pump-fiber 4600, taken along section 47-47 of FIG. 46. The pump-fiber comprises a cladding portion 4704 surrounding the core portions 4702*a*/4702*b*, which is equivalent to the cladding portion 4604 surrounding the core portions 4602*a*/4602*b* in FIG. 46, according to at least one embodiment of the disclosure. The pump-fiber is mostly a SM optical fiber at a wavelength of 980 nm, and the core diameter and MFD are in the range of 4-11 μm. The pump-fiber near the fiber end-face is a MM optical fiber at a wavelength of 980 nm, and the core diameter and MFD are in the range of 4-11 μm. While the pump-fiber near the fiber end-face is a MM optical fiber, only the fundamental mode is excited in the optical fiber because the fiber is kept straight, and the transition of the core from first diameter to the second larger diameter is adiabatic, hence, higher order modes are substantially not excited. The portion of the core portion defined by the first diameter contributes to maintaining signal power stability while the portion of the core portion defined by the second diameter contributes to reducing the pump light intensity on the fiber end-face and thus contributes to reducing the pump-fiber core portion damage.

In summary, for FIGS. 24-47, it is assumed that diameters 2401, 2601, 2801, 3401, 3601, 4001, 4401, and 4601 are equal, and that diameters 2803, 3003, 3203, 3403, 3803, 4003, 4203, and 4603 are qual. It is important to note, however, that these diameters do not have to be equal. There may be slight variances in the aforementioned diameters causing them to vary from one signal-fiber to a second signal-fiber, or from a signal-fiber to a common-fiber, etc.

Figure 48:
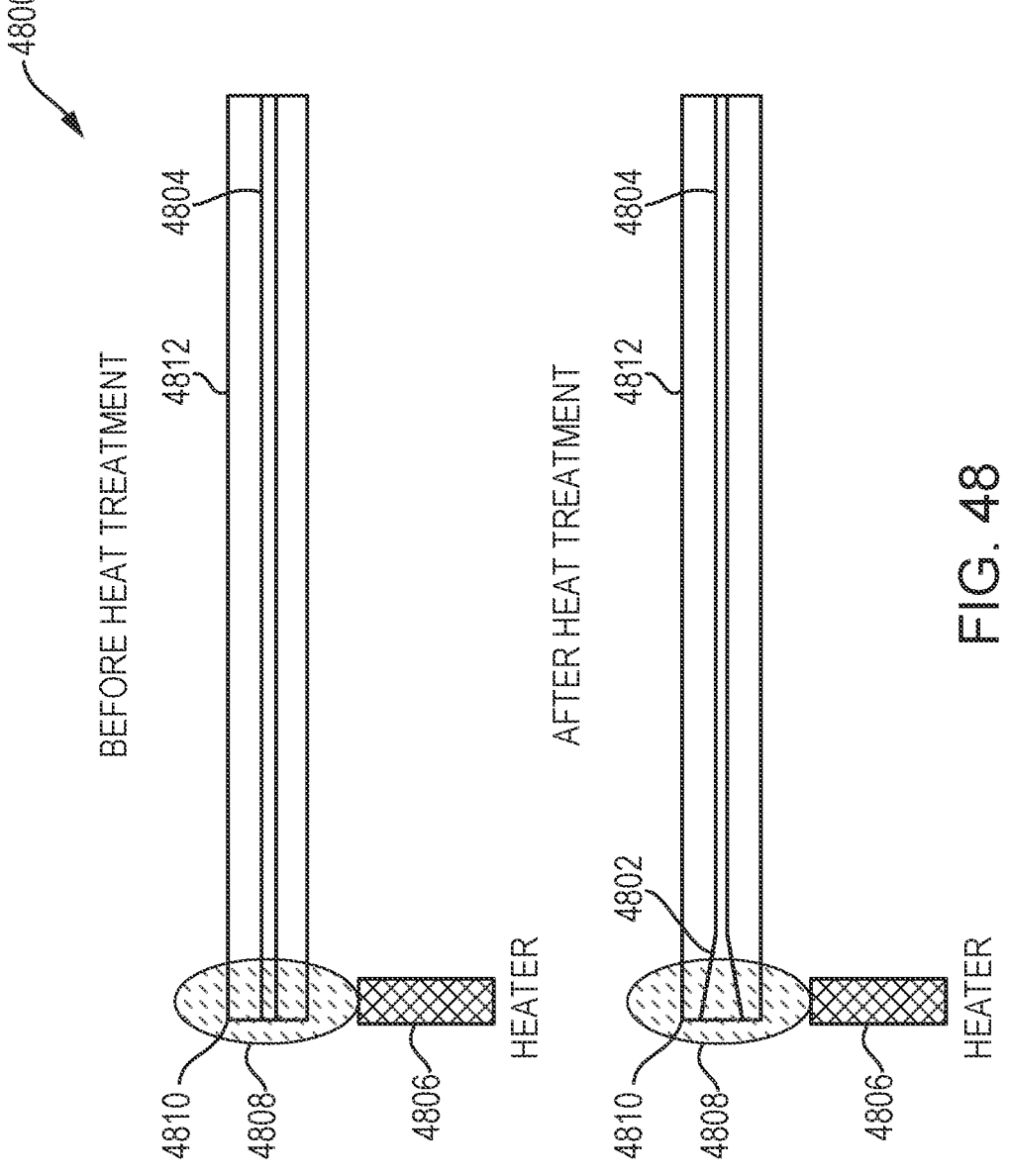
FIG. 48 illustrates a method of making an expanded tip at the fiber end-face of a core portion of an optical fiber, according to at least one embodiment of the disclosure.

FIG. 48 illustrates a method 4800 of making an expanded tip 4802 at the fiber end-face 4810 of an optical fiber's core 4804, according to an exemplary embodiment of the disclosure. The method uses a heat treatment process where a heat source 4806/4808, such as that from a flame 4808, heats up the fiber tip 4810 so that the dopant materials within the fiber's core diffuse out into the cladding portion 4812. The heat treatment lowers the refractive index of the core portion 4804 relative to the cladding portion 4812, while increasing the effective size of the core portion 4804. That is, the flame 4808 heats the fiber end-face 4810 causing the higher concentrated dopants in the core portion 4804 to diffuse into the cladding portion 4812 which has a lower concentration of dopants. Thus, the fiber end-face 4810 experiences greater spread of the dopants that effectively increases the fibers MFD, causing the light to spread further into the cladding portion 4812. It should be noted that there are other ways to create such an MFD expanded tip 4802, such as fiber tapering or fiber etching, however, it should be further noted that the presently disclosed method of heating dopant materials within the fiber's core is the exemplary method.

Figure 49:
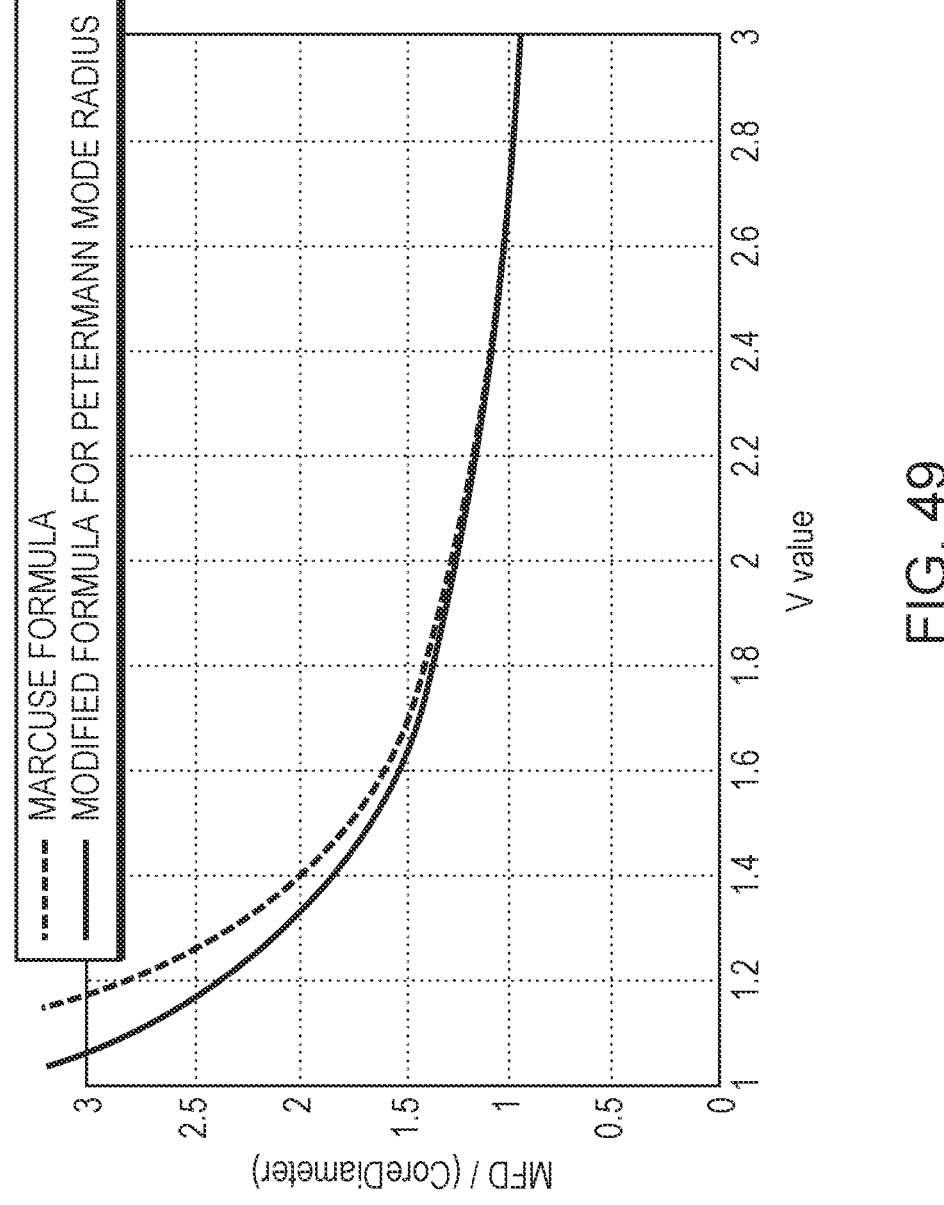
FIG. 49 includes a table data sheet with different fibers specifications as well as a plot illustrating the exponential relationship between MFD (w) divided by the core diameter (a) and the V value.

FIG. 49 is a plot illustrating the exponential relationship between MFD/Core Diameter and a V value. Table 1, found below, includes a table data sheet with different fibers' specifications. In the table data sheet, a list of three fibers is presented including single mode fibers (SMFs) and multimode fibers (MMFs), such as those manufactured by Corning. The table data sheet also lists the MFD of the fiber at an operation wavelength. One key takeaway is the difference in power density, also referred to as light density or light intensity, at the fiber end-face of Corning's HI1060 FLEX at a wavelength of 980 nm (4.0 µm) and the fiber end-face of Corning's Zero Bend Loss (ZBL) at a wavelength of 980 nm (9.0 µm). The optical power density is substantially calculated by squaring the MFD. Thus, the power of HI1060 FLEX at a wavelength of 980 nm is spread across 16 µm² while the power of ZBL at a wavelength of 980 nm is spread across 81 µm². This shows that the reduction of power density at the end-face between HI1060 FLEX and ZBL is roughly equivalent to a 5:1 ratio. That is, 500 mW of optical power at 980 nm in HI1060 FLEX yields a light intensity roughly equivalent to 100 mW of optical power in ZBL. It should be noted that this example is not, in any way, limiting to the present disclosure. Rather, the example set forth above is simply included in order to assist in the understanding of the different power intensities among different optical fibers comprising different modes, wavelengths, core diameters, and MFDs.

TABLE 1

Example Fiber Specifications

| Company | Example Fiber | MFD (µm) | Wavelength (nm) |
|---------|---------------|----------|-----------------|
| Corning | HI 1060 FLEX (SM at 1550 nm) | 6.30 | 1550 |
| Corning | HI 1060 FLEX (SM at 980 nm) | 4.00 | 980 |
| Corning | ZBL (SM at 1550 nm) | 9.65 | 1550 |
| Corning | ZBL (MM at 980 nm) | 9.00 | 980 |
| Corning | SMF 28 (SM at 1550 nm) | 10.4 | 1550 |
| Corning | SMF 28 (MM at 980 nm) | 9.00 | 980 |

Figures 50A, 50B, 50C:
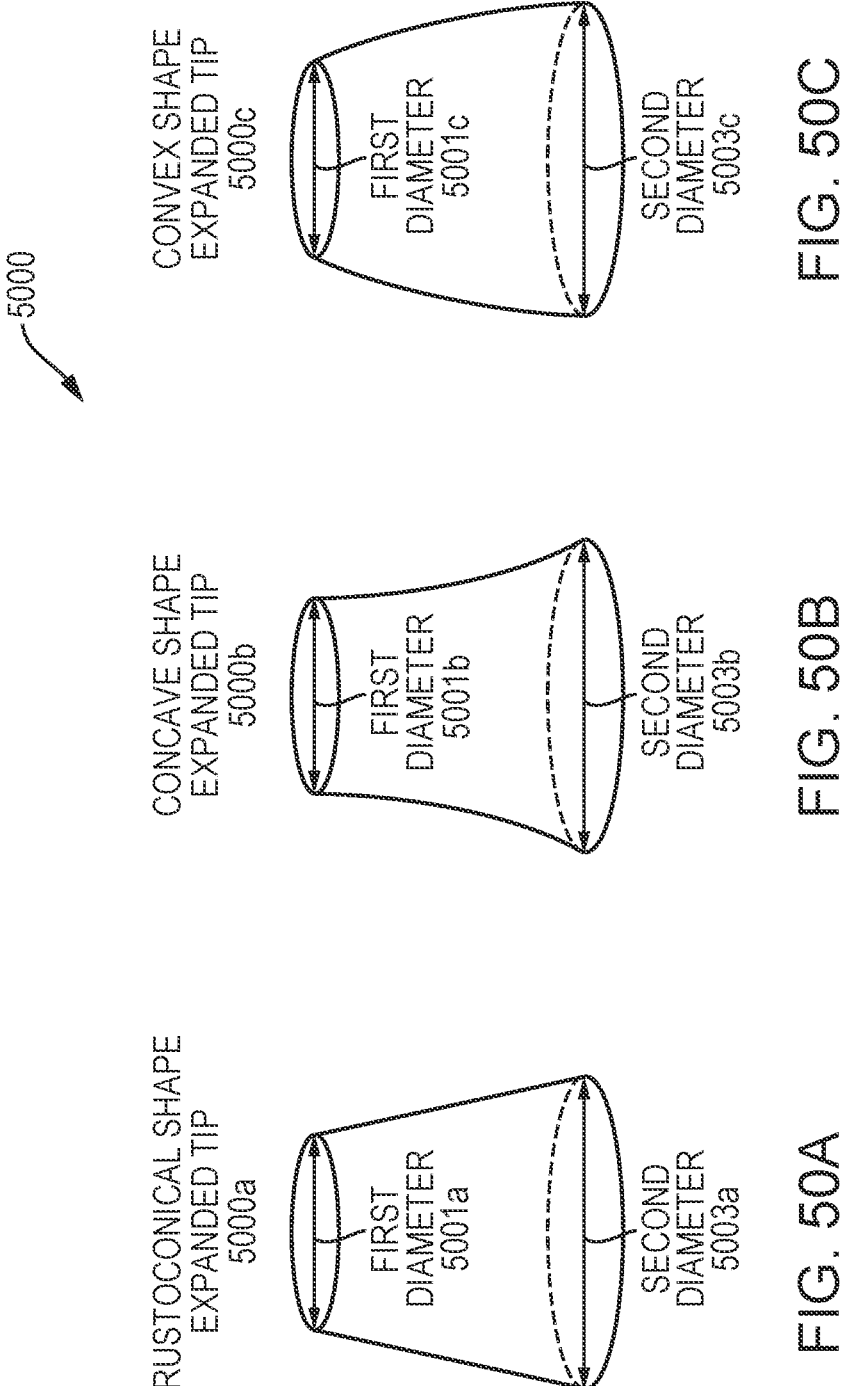
FIG. 50A illustrates an expanded tip comprising a Frustoconical shape.
FIG. 50B illustrates an expanded tip comprising a concave shape.
FIG. 50C illustrates an expanded tip comprising a convex shape.

FIGS. 50A-C illustrate different possible shapes 5000 that the above-mentioned expanded tip may resemble as a result of heating, tapering, or etching the fiber tip to create an expanded tip. FIG. 50A illustrates a linear Frustoconical shape 5000*a*, including a first diameter 5001*a* and a second diameter 5003*a*, that may be the result of creating an expanded tip. FIG. 50B illustrates a non-linear concave shape 5000*b*, including a first diameter 5001*b* and a second diameter 5003*b*, that may be the result of creating an expanded tip. FIG. 50C illustrates a non-linear convex shape 5000*c*, including a first diameter 5001*c* and a second diameter 5003*c*, that may be the result of creating an expanded tip. Each of the first diameters 5001*a*/5001*b*/5001*c* are smaller than each of the second diameters 5003*a*/5003*b*/5003*c*. Furthermore, each of the first diameters resemble the area that would be in contact with the non-expanded core portion area, and each of the second diameters resemble an area that would be in contact with the fiber end-face that would be in contact with a WDM filter of either a WDM-Isolator or a reverse WDM-Isolator. It should be noted that the present disclosure is not limited to resembling one of the aforementioned shapes, but rather the expanded tip described herein may resemble other linear or non-linear shapes as a result of creating an expanded tip.

Examples of the apparatus according to various aspects of the present disclosure are provided below in the following numbered clauses. Any aspect of the apparatus may include any one or more than one, and any combination of, the numbered clauses described below, however, for clarity, exemplary combinations have been detailed below. The examples and combinations provided below are not so limiting.

Clause 1. An apparatus, comprising an isolator wavelength division multiplexer, IWDM, comprising a WDM-Isolator core; a signal-fiber optically coupled to a first side of the WDM-Isolator core, the signal-fiber configured to propagate signal light; a pump-fiber defining an expanded tip optically coupled to a second side of the WDM-Isolator core, the pump-fiber configured to propagate pump light; and a common-fiber optically coupled to the second side of the WDM-Isolator core, the common-fiber configured to propagate a combination of the signal light and the pump light; wherein the WDM-Isolator core is configured to transmit the signal light to the common-fiber and to reflect the pump light into the common-fiber.

Clause 2. The apparatus of Clause 1, wherein the pump-fiber comprises a core portion and a cladding portion, wherein the core portion defines a first diameter over a portion of its length and a second diameter at a fiber end-face optically coupled to the WDM-Isolator core, wherein the second diameter is greater than the first diameter to define the expanded tip; wherein the common-fiber comprises a core portion and a cladding portion, wherein the core portion defines a single diameter over a portion of its length including a fiber end-face optically coupled to the WDM-Isolator core; and wherein the signal-fiber comprises a core portion and a cladding portion, wherein the core portion defines a single diameter over a portion of its length including a fiber end-face optically coupled to the WDM-Isolator core.

Clause 3. The apparatus of Clause 2, wherein the diameters of the core portions of the signal-fiber and the common-fiber are substantially the same as the first diameter of the core portion of the pump-fiber.

Clause 4. The apparatus of Clause 2, wherein the diameters of the core portions of the signal-fiber and the common-fiber are greater than the first diameter of the core portion of the pump-fiber.

Clause 5. The apparatus of Clause 2, wherein the diameter of the core portion of at least one of the common-fiber or the signal-fiber is greater than the first diameter of the core portion of the pump-fiber, and wherein the diameter of the core portion of the other of the common-fiber or the signal-fiber is substantially the same as the first diameter of the core portion of the pump-fiber.

Clause 6. The apparatus of Clause 2 or 4, wherein the diameter of the core portion of at least one of the common-fiber or the signal-fiber is greater than the diameter of the core portion of the other of the common-fiber or the signal-fiber.

Clause 7. The apparatus of Clause 2 or 4, wherein the diameter of the core portion of the signal-fiber is substantially the same as the diameter of the core portion of the common-fiber.

Clause 8. An apparatus, comprising an isolator wavelength division multiplexer, IWDM, comprising a WDM-Isolator core; a first fiber optically coupled to the WDM-Isolator core, the first fiber configured to propagate light at a first wavelength; a second fiber defining an expanded tip optically coupled to the WDM-Isolator core, the second fiber configured to propagate light at a second wavelength; and a third fiber optically coupled to the WDM-Isolator core, the third fiber configured to propagate a combination of the light at the first wavelength and the light at the second wavelength; wherein the WDM-Isolator core is configured to transmit the light at the first wavelength to the third fiber and to reflect the light at the second wavelength into the third fiber.

Clause 9. The apparatus of Clause 8, wherein the second fiber comprises a core portion and a cladding portion, wherein the core portion defines a first diameter over a portion of its length and a second diameter at a fiber end-face optically coupled to the WDM-Isolator core, wherein the second diameter is greater than the first diameter to define the expanded tip; wherein the third fiber comprises a core portion and a cladding portion, wherein the core portion defines a single diameter over a portion of its length including a fiber end-face optically coupled to the WDM-Isolator core; and wherein the first fiber comprises a core portion and a cladding portion, wherein the core portion defines a single diameter over a portion of its length including a fiber end-face optically coupled to the WDM-Isolator core.

Clause 10. The apparatus of Clause 9, wherein the diameters of the core portions of the first fiber and the third fiber are substantially the same as the first diameter of the core portion of the second fiber.

Clause 11. The apparatus of Clause 9, wherein the diameters of the core portions of the first fiber and the third fiber are greater than the first diameter of the core portion of the second fiber.

Clause 12. The apparatus of Clause 9, wherein the diameter of the core portion of at least one of the third fiber or the first fiber is greater than the first diameter of the core portion of the second fiber, and wherein the diameter of the core portion of the other of the third fiber or the first fiber is substantially the same as the first diameter of the core portion of the second fiber.

Clause 13. The apparatus of Clause 9 or 11, wherein the diameter of the core portion of at least one of the third fiber or the first fiber is greater than the diameter of the core portion of the other of the third fiber or the first fiber.

Clause 14. The apparatus of Clause 9 or 11, wherein the diameter of the core portion of the first fiber is substantially the same as the diameter of the core portion of the third fiber.

Having thus described several aspects and embodiments of the technology of this application, it is to be appreciated that various alterations, modifications, and improvements will readily occur to those of ordinary skill in the art. Such alterations, modifications, and improvements are intended to be within the scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112(f). Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. An apparatus, comprising:
an isolator wavelength division multiplexer (IWDM) comprising a WDM-Isolator core;
a signal-fiber optically coupled to a first side of the WDM-Isolator core, the signal-fiber configured to propagate signal light;

a pump-fiber comprising a core portion and a cladding portion, wherein the core portion defines a first diameter over a portion of its length and a second diameter at a fiber end-face optically coupled to a second side of the WDM-Isolator core, wherein the second diameter is greater than the first diameter to define an expanded tip, the pump-fiber configured to propagate pump light; and a common-fiber optically coupled to the second side of the WDM-Isolator core, the common-fiber configured to propagate a combination of the signal light and the pump light;

wherein the WDM-Isolator core is configured to transmit the signal light to the common-fiber and to reflect the pump light into the common-fiber.

2. The apparatus of claim 1, wherein the common-fiber comprises a core portion and a cladding portion, wherein the core portion defines a single diameter over a portion of its length including a fiber end-face optically coupled to the WDM-Isolator core; and wherein the signal-fiber comprises a core portion and a cladding portion, wherein the core portion defines a single diameter over a portion of its length including a fiber end-face optically coupled to the WDM-Isolator core.

3. The apparatus of claim 2, wherein the diameters of the core portions of the signal-fiber and the common-fiber are substantially the same as the first diameter of the core portion of the pump-fiber.

4. The apparatus of claim 2, wherein the diameters of the core portions of the signal-fiber and the common-fiber are greater than the first diameter of the core portion of the pump-fiber.

5. The apparatus of claim 2, wherein the diameter of the core portion of at least one of the common-fiber or the signal-fiber is greater than the first diameter of the core portion of the pump-fiber, and wherein the diameter of the core portion of the other of the common-fiber or the signal-fiber is substantially the same as the first diameter of the core portion of the pump-fiber.

6. The apparatus of claim 2, wherein the diameter of the core portion of at least one of the common-fiber or the signal-fiber is greater than the diameter of the core portion of the other of the common-fiber or the signal-fiber.

7. The apparatus of claim 2, wherein the diameter of the core portion of the signal-fiber is substantially the same as the diameter of the core portion of the common-fiber.

8. An apparatus, comprising:

an isolator wavelength division multiplexer (IWDM) comprising a WDM-Isolator core;

a signal-fiber optically coupled to a first side of the WDM-Isolator core, the signal-fiber configured to propagate signal light;

a pump-fiber defining an expanded tip optically coupled to a second side of the WDM-Isolator core, the pump-fiber configured to propagate pump light; and a common-fiber optically coupled to the second side of the WDM-Isolator core, the common-fiber configured to propagate a combination of the signal light and the pump light;

wherein the WDM-Isolator core is configured to transmit the signal light to the common-fiber and to reflect the pump light into the common-fiber;

wherein the pump-fiber comprises a core portion and a cladding portion, wherein the core portion defines a first diameter over a portion of its length and a second diameter at a fiber end-face optically coupled to the WDM-Isolator core, wherein the second diameter is greater than the first diameter to define the expanded tip;

wherein the common-fiber comprises a core portion and a cladding portion, wherein the core portion defines a single diameter over a portion of its length including a fiber end-face optically coupled to the WDM-Isolator core; and wherein the signal-fiber comprises a core portion and a cladding portion, wherein the core portion defines a single diameter over a portion of its length including a fiber end-face optically coupled to the WDM-Isolator core.

9. The apparatus of claim 8, wherein the diameters of the core portions of the signal-fiber and the common-fiber are substantially the same as the first diameter of the core portion of the pump-fiber.

10. The apparatus of claim 8, wherein the diameters of the core portions of the signal-fiber and the common-fiber are greater than the first diameter of the core portion of the pump-fiber.

11. The apparatus of claim 8, wherein the diameter of the core portion of at least one of the common-fiber or the signal-fiber is greater than the first diameter of the core portion of the pump-fiber, and wherein the diameter of the core portion of the other of the common-fiber or the signal-fiber is substantially the same as the first diameter of the core portion of the pump-fiber.

12. The apparatus of claim 8, wherein the diameter of the core portion of at least one of the common-fiber or the signal-fiber is greater than the diameter of the core portion of the other of the common-fiber or the signal-fiber.

13. The apparatus of claim 8, wherein the diameter of the core portion of the signal-fiber is substantially the same as the diameter of the core portion of the common-fiber.

14. An apparatus, comprising:

an isolator wavelength division multiplexer (IWDM) comprising a WDM-Isolator core;

a first fiber optically coupled to the WDM-Isolator core, the first fiber configured to propagate light at a first wavelength;

a second fiber comprising a core portion and a cladding portion, wherein the core portion defines a first diameter over a portion of its length and a second diameter at a fiber end-face optically coupled to a second side of the WDM-Isolator core, wherein the second diameter is greater than the first diameter to define an expanded tip, the second fiber configured to propagate light at a second wavelength; and a third fiber optically coupled to the WDM-Isolator core, the third fiber configured to propagate a combination of the light at the first wavelength and the light at the second wavelength;

wherein the WDM-Isolator core is configured to transmit the light at the first wavelength to the third fiber and to reflect the light at the second wavelength into the third fiber.

15. The apparatus of claim 14, wherein the third fiber comprises a core portion and a cladding portion, wherein the core portion defines a single diameter over a portion of its length including a fiber end-face optically coupled to the WDM-Isolator core; and wherein the first fiber comprises a core portion and a cladding portion, wherein the core portion defines a single diameter over a portion of its length including a fiber end-face optically coupled to the WDM-Isolator core.

16. The apparatus of claim 15, wherein the diameters of the core portions of the first fiber and the third fiber are substantially the same as the first diameter of the core portion of the second fiber.

17. The apparatus of claim 15, wherein the diameters of the core portions of the first fiber and the third fiber are greater than the first diameter of the core portion of the second fiber.

18. The apparatus of claim 15, wherein the diameter of the core portion of at least one of the third fiber or the first fiber is greater than the first diameter of the core portion of the second fiber, and wherein the diameter of the core portion of the other of the third fiber or the first fiber is substantially the same as the first diameter of the core portion of the second fiber.

19. The apparatus of claim 15, wherein the diameter of the core portion of at least one of the third fiber or the first fiber is greater than the diameter of the core portion of the other of the third fiber or the first fiber.

20. The apparatus of claim 15, wherein the diameter of the core portion of the first fiber is substantially the same as the diameter of the core portion of the third fiber.

* * * * *